United States Patent [19]

Sagawa et al.

[11] Patent Number: 5,273,782
[45] Date of Patent: Dec. 28, 1993

[54] COATED PARTS WITH FILM HAVING POWDER-SKELETON STRUCTURE, AND METHOD FOR FORMING COATING

[75] Inventors: Masato Sagawa, Kyoto; Hiroshi Watanabe, Tokyo; Hiroo Shirai, Osaka, all of Japan

[73] Assignee: Intermetallics Co., Ltd., Kyoto, Japan

[21] Appl. No.: 926,433

[22] Filed: Aug. 10, 1992

[30] Foreign Application Priority Data

| Aug. 9, 1991 | [JP] | Japan | 3-224782 |
| Oct. 17, 1991 | [JP] | Japan | 3-296685 |
| Feb. 24, 1992 | [JP] | Japan | 4-072220 |
| Jul. 22, 1992 | [JP] | Japan | 4-215755 |

[51] Int. Cl.$^5$ .......................... B05D 3/12; B05D 3/02
[52] U.S. Cl. .................... 427/242; 427/11; 427/192; 427/195; 427/407.1; 427/443.1; 427/404; 205/80
[58] Field of Search .............. 427/11, 346, 242, 192, 427/195, 407.1, 443.1, 421; 205/80

[56] References Cited

U.S. PATENT DOCUMENTS

| 2,640,001 | 5/1953 | Clayton | 427/242 |
| 2,640,002 | 5/1953 | Clayton | 427/242 |
| 3,093,501 | 6/1963 | Clayton | 427/242 |
| 4,849,258 | 7/1989 | Clayton | 427/242 |

FOREIGN PATENT DOCUMENTS

| 853998 | 7/1949 | Fed. Rep. of Germany . |
| 1072857 | 1/1952 | Fed. Rep. of Germany . |
| 52-43731 | of 0000 | Japan . |
| 57-54270 | of 0000 | Japan . |
| 2-71872 | of 0000 | Japan . |
| 51-143531 | of 0000 | Japan . |
| 56-45372 | 4/1981 | Japan . |
| 8903739 | 5/1989 | World Int. Prop. O. . |

Primary Examiner—Shrive Beck
Assistant Examiner—David M. Maiorana
Attorney, Agent, or Firm—Fish & Richardson

[57] ABSTRACT

Powder-content of a powder-coating is enhauced. Powder material forms a skeleton structure. The clearances are filled with resin. The coating comprises a resin layer which bonds the power-compacted layer to the parts or any underlying powder-compacted layer. The work pieces on which a resin film may be preliminarily formed, is subjected to vibration or stirring together with the powder material and means for mediating the formation of the coating, which eans is of substantially smaller size than said work pieces and greater size than said powder material, as well as with or without the resin, to vibration or stirring in a container.

29 Claims, 23 Drawing Sheets

A-1

A-2

B-1

B-2

COATED PARTS WITH FILM HAVING POWDER-SKELETON STRUCTURE, AND METHOD FOR FORMING COATING

BACKGROUND OF INVENTION

1. Field of Invention

The present invention relates to various parts, on whose surface a coating is formed, as well as a method for forming the film. Various parts herein are mechanical parts used for various machines, automobiles, other vehicles, ships and aircraft, electrical and electronic parts, ornamental parts, metal fittings, magnets, toy parts and the like. Large construction parts such as steel frames and bridges are excluded from the various parts herein. Materials of the various parts herein are metal, alloy, intermetallic compounds, inorganic compounds, plastics, ceramics and the like. In addition, the various parts may hitherto have been subjected to the formation of conventional films, such as resin coating or plating or other surface modification.

The film herein can be applied to all of the applications, to which the conventional powder-film or resin-film has been applied, and is mainly applied to enhance corrosion-prevention, mechanical strengthening, formation of electro-conductive or insulating film and/or to improve appearance. Specific applications of the coating herein are: a conductive film with metallic or carbon powder; a thin magnetic film with dispersed magnet powder; a fluorescent film; a tool or cutter, on whose substrate a diamond or SiC coating is formed.

2. Description of Related Arts

The following prior art related to the film, which comprises powder and to which the present invention belongs, is heretofore known.

(1) Resin Coating Film

A resin coating film is provided by applying paint on the surface of parts, vaporizing the solvent in the paint and polymerizing the resin or the like. The paint is prepared by dispersing various pigments in resin or other vehicle, such drying oil and half-drying oil as linseed oil, safflower oil and soybean oil. The kind of resin and pigments used as well as their blending proportion affect the corrosion-proof performance, appearance, mechanical properties and the like. Recently, in various parts, such as parts related to automobiles, precision machines and electronics, the coating is required to be thin, and to have high dimensional accuracy and good corrosion-proof performance. To meet these requirements, the pigment amount should be increased. However, when the pigment amount is excessively increased, the paint loses most of its viscosity so that the film formation becomes virtually impossible. The pigment amount in the conventional coating film therefore does not exceed 40% by volume at the most. Another problem arises when the proportion of pigment blending in the coating film is increased. Generally, it is considerably difficult to completely uniformly disperse the pigment powder in the resin coating film. Powder aggregates in the form of clusters may be occasionally formed. The thus-formed film includes portions where the pigments are loosely dispersed; these portions are ineffective in impeding corrosive media, such as water, which irpiertu controls the corrosion-proof performance of the film. Therefore, no matter how many pigments are blended, not all of the pigments are effectively utilized to extract their properties.

Incidentally, zinc-rich paint containing from 40 to 50% by volume of zinc powder is used as rust-proof paint of large constructions, such as bridges, but has not been used for the various parts herein. Since the zinc-rich paint contains an excessive amount of the pigment, it can be applied on an article not by spraying but by brush. This is a reason why this paint is not applied to the various parts herein.

(2) Powder Film

Flame spraying of powder, such as metal powder, is a method in which the powder is used as the starting material, but the powder is partially or totally melted. The so-formed film is therefore a continuous film. Methods for forming a powder film are very few One method is disclosed in Japanese Examined Patent Publication No. 2-71872. According to the present invention, the surface of parts, whose surface is preliminarily rendered adhesive, is brought into contact with the powder material; vibration is imparted to the parts so as to compress the powder adhered on the parts surface to the bulk density or less; subsequently, the powder not bonded to the parts is removed. The parts and powder specifically disclosed in said publication are color television screens and the fluoresecnt toner. The so-formed film includes numerous pores and hence is not appropriate for corrosion-prevention purpose. Its application is therefore limited.

Other methods are the mechanical barrel method disclosed in U.S. Pat. Nos. 2,640,001 and 4,849,258. Powder such as tin or aluminum powder is dispersed in a dispersing medium, selected from vegetable oil, grease, and silicone oil, and is plated on the parts by the barrel plating manner. It is disclosed in U.S. Pat. No. 4,849,258 that silicone resin is additionally used to improve the lubricating property. Flux such as acid is used to activate the parts surface. It is described that, when the oil lubricant forms a film on the parts surface, the formation of plating film is impeded. A large amount of emulsifier is used to prevent the oil film formation. The above U.S. patents describe that intended uniform metal film, such as Zn film, is not formed, when material other than metal, such as resin, is deposited on the surface of parts. Since the film consists of a metal layer which is directly adhered on the parts which have been activated by acid or the like, the parts surface seems to be very clean and the film adherence seems to be very sensitive to oxides and foreign matters. When the parts to be plated are subjected to ordinary degreasing but are not activated by the flux during the barrel treatment, no film seems to be formed, or, even if any film is formed, its adherence seems to be very poor. In addition, since the lubricant, emulsifying agent and flux are used in large amounts, there is a danger that impurities such as carbon and the like are incorporated in the film.

The following methods (1)-(3) are known in the prior art of method for forming a film, to which the present invention belongs.

(1) Powder Painting

Powder paint is deposited by spraying, atomizing, flame-spraying, electrostatic spraying or the like on the parts, which have been pre-heated. The so-deposited powder melts and forms a film on the parts. The powder painting is disclosed, for example, in Japanese Unexamined Patent Publications Nos. 53-29,347 and 2258,084 and Japanese Examined Patent Publication Nos. 57-13,347 and 58-37,029. This method is pollution-free and can save natural resources because no solvent is used. The powder-film formation method is advantageous over the various film-formation method in the following points. It is advantageous over the electro- and electroless plating methods in the point that, since neither acid nor alkali is used, treatment of waste liquid is not necessary. Furthermore, even if the work piece is active, no corrosion problem arises. It is advantageous over the hot dip plating method in the point that exposure of the work piece to high temperature is avoided. It is advantageous over the PVD and CVD methods in the point that a large-scale plant is unnecessary and productivity is high. When the powder paint is applied on small parts by dispersing or spraying, the parts must be reversed upside down or hanged down from a hook. Powder painting is therefore not said to be economical.

(2) Coating of Powder

The above-mentioned Japanese Unexamined Patent Publication No. 2-71872 refers to the powder coating on a work piece whose surface is adhesive. Japanese Unexamined Patent Publication No. 52-43731 refers to the powder coating on a work piece whose surface is not adhesive. In this publication, the metal or alloy powder and granular hard materials are admitted in a hollow metallic body, and the hollow metallic body is rotated or vibrated so that the inner surface of the metallic body is covered with the metal or alloy powder. The powder is pressure-bonded on the metallic body and is also diffusion-bonded with this body due to the heat energy resulting from the vibration.

The above-mentioned U.S. Pat. Nos. 2,640,001 and 4,849,258 refers to the powder coating method on a work piece whose surface is not adhesive. According to this method, the metal parts, metal powder, lubricant and steel balls or glass beads are loaded in a container drum. The steel balls and glass beads impart the impact force onto the metallic powder which is then pressure-bonded on a work piece. Under the presence of the lubricant, the metal powder does not coagulate but is uniformly dispersed and flows, so that uniform film with good finishing is obtained. In addition, since excessive frictional force between the metal powder and parts is decreased, the impact force is effectively used for the pressure bonding. The impact force required for forming a coating in these U.S. patents is smaller than that required in Japanese Unexamined Patent Publication No. 52-43,731 mentioned above.

There is another method which refers to the powder coating on a non-adhesive work piece as is disclosed in Japanese Unexamined Patent Publication No. 56-45,372. According to the method disclosed in this publication, blast material is prepared in such a manner that an iron-zinc alloy layer is formed on the cores consisting of iron or iron alloy to surround the cores, zinc alloy is deposited on the iron-zinc alloy layer. The so-treated cores are separate from one another and form an aggregate, which is the blast material and is projected onto the surface of the iron or iron-alloy so as to form a zinc coating on said surface. Japanese Unexamined Patent Publication No.60-245,784 discloses formation of a chromate coating on the zinc coating mentioned above. The powder adhered directly on the adhesive surface disclosed in Japanese Unexamined Patent Publication No. 2-71,872 exhibits a degree of bonding force. The powder present on the former surface is merely compacted due to the vibrating force imparted to the powder particles. The latter powder is therefore easily removed from the coating when it is subjected to external force. Furthermore, considerable clearances are formed in the coating. The coating is therefore not appropriate for corrosion-prevention, because corrosive media easily pass through the clearances. In addition, the throwing power of the powder is poor when the work piece is concave or convex.

When mechanical bonding (pressure-bonding) and diffusion-bonding are simultaneously carried out as is disclosed in Japanese Unexamined Patent Publication No. 52-43,731, considerable energy is necessary, such as 500 kg of imparting force generated by a vibrating mill, rotation of 300 rpm generated by a high-speed planetary mill. The work piece must therefore have high strength Ceramics, plastics with low strength and the like cannot therefore be the work piece. In addition, oxides and other brittle powder are destroyed by the vibration and therefore cannot be used. Furthermore, the method disclosed in Japanese Unexamined Patent Publication No. 52-43,731 is applied only to the coating on the inner surface of a work piece.

In the methods disclosed in the two U.S. patents, it is described that a strong emulsifying agent is necessary for preventing the formation of a lubricant film (oil, resin or the like) on the surface of a work piece. If the emulsifying agent is not added, the lubricant covers the work piece and forms an adhesive film, which impedes the formation of powder coating, as is clearly described therein. In addition, the metals which can be used are limited to soft powder, such as Zn, Sn or Cu.

In the methods disclosed in Japanese Unexamined Patent Publications Nos. 56-45,372 and 60-245,784, the projecting force of the blast steel particles would be as high as that of shot blasting.

(3) Rolling of Metal Powder

Metal powder is adhered on the surface of a rolled sheet and is then pressure-bonded on the rolled sheet. Subsequently, heat treatment is carried out to diffusion-bond the metal powder and the rolled sheet (c.f. Japanese Unexamined Patent Publication Nos. 47-29,232, 51-143,531, 52-33,840, and 57-54,270). The work piece to be treated must be in sheet form and consist of rollable material. Powder coating cannot be formed directly on the mechanical parts.

SUMMARY OF INVENTION

As is described hereinabove, no conventional powder-coating fulfills the following requirements (a) the powder is in high proportion and is uniformly distributed and the parts have not been subjected thermal treatment, and/or (b) the coating can be formed on a work piece, whose surface is of normal cleanness.

It is therefore an object of the present invention to provide a powder coating formed on the various parts and fulfilling the requirements (a) and/or (b).

It is another object of the present invention to provide a method for forming a powder coating on various parts, which method does not suffer from the disadvantages described above and which can form a tight powder coating having improved bonding strength.

In accordance with the objects of the present invention, there is provided parts having a coating thereon, which coating comprising at least one powder-compacted layer, said layer comprising compacted powder material which forms a skeleton structure, and clearances, at least a part of which is filled with resin, which coating further comprising a resin layer which bonds the powder-compacted layer to the work piece or any underlying powder-compacted layer.

In accordance with the objects of the present invention, there is also provided a method for forming a coating on a work piece, characterized in that: work pieces, resin, which is at least partially uncured at least in the initial period of the coating forming, powder material, which may be resin powder harder than said resin during the coating-forming process, and, means for mediating the formation of the coating, which means is of substantially smaller size than said work pieces and greater size than said powder material and is subjected to vibration or stirring in a container, thereby forming the coating containing the powder material.

According to another method, an uncured resin film is preliminarily formed on the work pieces and, then, the powder, work pieces and means for mediating the coating-formation are subjected to vibration or stirring.

The present invention is described hereinafter more in detail.

Powder Coating

The powder coating is first described.

In the present invention, such thermosetting resins as melamine resin, epoxy resin, phenol resin, furan resin, urethane resin, unsaturated polyester resin, polyimide resin, urea resin and the like, as well as such thermoplastic resins as acrylic resin, polyester resin, polyethylene resin, polyethylene terephthalate, polypropylene, polyvinyl chloride, polyvinyl alcohol, nylon, polystyrene, polyvinyl acetate and the like can be used. Cellulose derivatives can also be used. Liquid prepolymer or monomer, an organic binder usually used for the shaping of powder, e.g., paraffin or camphor, can also be used. Natural resins, such as gelatin, glue, and Japanese lacquer can be used. Inorganic adhesive material such as silicate, a representative compound being waterglass, can be used instead of or together with the resin. The resin may contain an inorganic pigment(s).

The powder is the constituent material of the powder-compacted layer. Part of the powder material may be incorporated in the resin layer and become its constituent material. Various metals, alloys and ceramics in the powder form as well as pigments can be used as the powder material.

Metal powder may be the powder of Al, Cu, Fe, Cr, Co, Ni, Zn, Pb, Sn, Rh, Ir, Pd, Pt, Ag, Au, Mo, W or an alloy powder with the main element being one of these metals. All of these metals have strength higher than resins and do not deteriorate due to water or salt water, and hence have good corrosion resistance. Features of the respective metals are well known.

Ceramics are more chemically stable than metals as well as electro-insulating and corrosion-proof. MgO, PbO, $PbO_2$, $Al_2O_3$, $SiO_2$, $TiO_2$, $CrO_2$, $MnO_2$, $Fe_2O_3$, FeO, $Fe_3O_4$, CoO, NiO, CuO, ZnO, $ZrO_2$, MoO, PbO, $PbO_2$, and the like can be used. Composite oxides based on several of these compounds, various stable nitrides, such as TiN, BN, and various stable carbides such as SiC, WC, and TiC can also be used.

When the coating is used to enhance appearance of the parts, various pigments such as carbon black, quinacridone red, permanent yellow, phthalocyanine blue can be used as pigments. The pigment can be mixed with the above-mentioned powder.

The resin is a constituent material of the resin layer and is filled at least partially in the clearances and disordered portions of the skeleton structure described hereinafter.

The grain size of the powder material depends on the size of the work pieces, thickness of coating, and material of the powder. When the powder is hard and difficult to deform as in the case of ceramics, small grain size is desirable. The grain size is usually within a range of from 0.01 to 500 $\mu$m, preferably form 0.01 to 300 $\mu$m, and more preferably from 0.01 to 100 $\mu$m. Ductile powder, e.g., metal powder, may exceed this range.

The structure of the coating is now described.

In the powder-compacted layer, the particles of the powder are brought into surface contact with each other and are connected three-dimensionally. The powder therefore forms a skeleton as in a green compact produced by powder metallurgy. Powder particles with low ductility are compacted in the skeleton, while maintaining the particle size at its production. On the other hand, powder particles with high ductility are deformed into platelets under high compression force, and the platelets are stacked on one another and compacted. Clearances between the particles or platelets are completely or partially filled with the resin. If any clearances are left, their volume is considerably smaller than that of the skeleton, and the remaining clearances exert slight influence upon the strength or the like, practically speaking.

The powder-compacted layer contains therefore powder in a high volume proportion which cannot be attained by the conventional resin coating. For example, when the powder is relatively hard, such as Ni powder, the powder proportion in the coating layer can be 55% by volume. When the powder is relatively soft, such as Ag powder, the powder proportion in the coating layer can be 65% by volume. Representative bulk density of the Ni and Ag powder is approximately 20% relative to the theoretical density, while the bulk density of such powder is from 25 to 30%. The powder proportion of the resin coating cannot exceed the bulk density, unless a high pressure is applied to the coating. Actually, the powder proportion of the resin coating is considerably less than the bulk density.

The inter-connection of the powder in the powder-compacted layer is locally two-dimensional. Although such inter-connection is evidently two-dimensional at the top and bottom of the powder-compacted layer, two-dimensional inter-connection is formed within the coating layer and disorders the skeleton structure. The clearances of the ordinary skeleton structure with the three-dimensional inter-connection are of approximately the same size as that of the particles. The clearances of the disordered skeleton structure are considerably greater than the particle size and decrease the strength of the powder-compacted layer. Filling in such clearances with resin can effectively reinforce the powder-compacted layer. Fundamentally, filling in the clearances in the ordinary skeleton structure with resin is hereinafter described. This description is also applicable to the filling in of the clearances of the disordered skeleton structure.

The powder particles are bonded with each other at the contact surface with the bonding strength which results from the pressure bonding and friction forces due to plastic deformation. Such bonding is similar to that in the green compact of powder metallurgy. In the case of a soft metal powder having low melting point and resin powder, thermal diffusion takes place partially at the contact surface of powder. The bonding force described above mainly determines the mechanical properties of the skeleton.

In the conventional resin coating, the mechanical properties are mainly determined by the resin when the pigment amount is small. The powder in the conventional paint coating does not form a skeleton but is dispersed, and, the powder amount being small, with the result that the powder exerts slight influence on the mechanical properties of the resin coating. The aggregates in the form of clusters, which may be formed in the conventional resin coating with a high amount of powder, are not so strong as to form the skeleton. In addition, since the resin is not satisfactorily extended in the cluster, the cluster is very fragile and is likely to collapse. Since the aggregates increase with the increase in the pigment amount, the mechanical properties, particularly the wear-resistance of the coating degrades with the increase in the pigment amount. Furthermore, not only is the resin amount decreased, but also its distribution becomes non-uniform. As a result, the adhesion of coating is lowered drastically.

Contrary to the resin coating, the particle density varies little in the skeleton according to the present invention, which therefore does not have fragile parts as in the case of the cluster aggregates. Notwithstanding a high blending proportion of powder, the coating is homogeneous and has improved mechanical properties, particularly wear-resistance.

Many of the clearances in the skeleton are open pores on the coating surface. Resin filled in the clearances is connected with the resin layer through the pore openings. As a result, the resin in the clearances of the powder-compacted layer are like long pins or bolts and exerts strong bonding force. In addition, since the resin in the clearances is not straight but is zigzag curved, the bonding strength is further enhanced.

The resin filled in the clearances in the skeleton structure enhances the adherence of the powder-compacted layer and resin layer and, further, reinforces the skeleton structure and hence the powder-compacted layer.

As is described hereinabove, the ductile metal powder forms a skeleton, in which the metal particles are deformed flat, and the so-deformed metal pieces are laminated on one another. The clearances therefore communicate with each other mainly in a horizontal direction, i.e., between the flat metal platelets. The resin is filled in the flat clearances, because the resin is filled as soon as the skeleton and clearances are formed, or because the powder surrounds the resin during formation of the skeleton. The ceramic powder forms, on the other hand, a skeleton, in which the metal powder is not deformed, and the clearances communicate with each other equally in horizontal and vertical directions.

The powder-compacted layer may include isolated clearances, which have almost the same size as the powder particles and which are isolated with the clearances described above The isolated clearances may be present both in the ordinary and disordered skeletons. The isolated clearances are preferably at least partially filled with resin, so as to reinforce the skeleton. Filling of the isolated clearances becomes possible by means of filling them simultaneously with their formation. Since the contiguous and isolated clearances are filled with resin, the film according to the present invention neither peels nor falls down from the substrate as frequently happens in the case of resin coating with many pigments.

The resin layer is an intermediate layer between the powder-compacted layer and the surface of parts and strongly bonds the skeleton with the surface of parts. The resin layer enhances the bonding strength much more higher than that of direct bonding between the skeleton and the parts, where the powder and surface roughness of the parts mesh with one another due to friction force, which meshing is the main bonding force.

It is possible to impregnate resin from outside the coating into the continuous clearances of the skeleton structure.

The thickness of the powder-compacted layer is not specified at all and is appropriately determined depending upon the size of parts and the coating property required. The thickness of the powder-compacted layer is usually 500 $\mu$m at the thickest. When the thickness exceeds this value, no advantages are attained by the thickness increase while the thickness of the coating becomes non-uniform and dimensional accuracy decreases. The powder-compacted layer has preferably a thickness of from 50 $\mu$m or less for the parts, which are used for precision machines and electronic parts which are required recently to have high dimensional accuracy. On the other hand, when the thickness of the coating is less than 0.1 $\mu$m or less, such requisite properties as corrosion resistance are not obtained.

When the volume ratio of powder material is 30% or less in the powder-compacted layer, the proportion of clearances in the skeleton increases and the contact area of the powder particles decreases. As a result, the requisite properties such as corrosion resistance are not obtained. The desirable proportion of the powder material is 40% or more. A more desirable proportion of the powder material is 45% by volume or more. The most desirable volume proportion is 50% is more.

The resin layer, which is present between the powder-compacted layer and parts, may comprise in its upper part a transition region containing powder material the amount of which gradually decreases toward the lower part. The resin layer may contain powder material in such an amount as in the usual resin coating. Even in this case, the resin layer mainly contains resin and covers all or almost all of the surface of parts and plays the role of bonding the powder-compacted layer onto the surface of parts. The resin layer protrudes, on its side facing the parts, into minute concavities of the parts and achieves an anchoring effect. The adherence of the resin with the parts generates also the bonding force. The resin layer eliminates on the surface of parts contaminants such as foreign matters, oxides and the like which are detrimental factors impeding the bonding, so that the powder can be easily formed on the parts, whose surface is of normal cleanness.

At the side facing the powder-compacted layer, the resin layer exhibits adherence with respect to the resin filled in the skeleton and also exhibits an anchoring effect, with the result that the powder-compacted layer is bonded to the resin layer. Usually, the resin layer has a thickness of from 0.1 to 20 $\mu$m. When the thickness is less than this value, the above-described effects are not fully demonstrated and the bonding strength is hence low. On the other hand, when the thickness of the bonding layer is more than 20 $\mu$m, not only are its effects not enhanced with the increase in the thickness, but also the resin layer has non-uniform thickness. Desirable thickness of the resin layer is from 0.5 to 10 $\mu$m. A more desirable thickness of the resin layer is from 0.5 to 10

μm. A further desirable thickness of the resin layer is from 1.0 to 5 μm.

The above-described thickness values of the powder and resin layers may be satisfied by the average thickness-value of the layers. The layer thickness may vary so that it locally falls outside the above-described ranges. Desirably, the thickness variation is, however, as small as possible. The direct contact between the powder and parts decreases with the decrease in the powder content of the resin layer. The bonding strength is therefore enhanced.

The coating according to the present invention may consist of two or more layers, each layer consisting of the resin and powder-compacted layers. The kinds of resin and/or powder may be different from one another with regard to these layers. Three or fewer layers are preferably used for constructing the coating according to the present invention because four or more layers are too thick to keep the process short and economical.

The coating according to the present invention can be formed by aggregating and bonding the powder particles under the presence of resin in such a degree that the powder particles do not form a continuous body. One of such methods is the one in which a container with powder-forming media is vibrated or stirred.

A protective resin coating may be applied on the surface of the coating according to the present invention described above. The protective resin coating is effective for enhancing the strength and corrosion resistance of the entire coating. When the powder-compacted layer is exposed on the coating surface and is subjected to impact force or strong force from outside during handling and mounting of the parts in a machine, the powder material may partly be removed or the coating may be locally damaged. The protective resin coating is effective for preventing these problems as described above. The resin smoothens and enhances the appearance of the coating surface. The resin pinholes are filled with resin. The kind of resin of the protective resin coating may be the same as or different from that of the resin of the coating. The protective resin coating is desirably from 0.5 to 300 μm. When the thickness is less than 0.5 μm, the protective function is virtually lost. On the other hand, when the thickness is more than 300 μm, the above-described problems of thick layers also arise.

The protective coating may be resin coating, and, in addition, electro or electroless plating of any known metal or alloy and dispersion plating of metal and non-metallic material. When at least the top most part of the coating is the powder-compacted layer with metal or alloy powder, electro-conductivity of the coating surface is so enhanced that various platings can be applied on the coating surface. The plating layer and the metal in its underlying powder-compacted layer prevent the corrosion of parts. The parts according to the present invention are therefore more corrosion-resistant than the conventionally plated parts.

When a plating layer is formed on the coating of the invention, the clearances formed in the skeleton and remaining unfilled with the resin may result in the formation of many more pinholes in the plating layer than in the usual plating layer. In order to prevent such formation, the plating layer of any known metal or alloy can be thickly formed on a substrate of any material or a thin electro-less plating layer can be formed beneath the plating layer.

Preferred embodiments of the parts are hereinafter described with regard to the housing, box or the like with an electromagnetic interference (EMI) coating, as well as rareearth magnets.

The coating according to the present invention, containing stable oxides such as $TiO_2$, $MgO$, $Fe_2O_3$ and the like, is formed on the sintered rare-earth magnets, such as Nd-Fe-B magnets. The oxide is dispersed in the powder-compacted layer and improves the corrosion resistance as compared with the conventional resin coating. Particularly, the corrosion resistance is improved when the content of oxide is high at the surface of the coating.

A single coating according to the present invention, formed on the resin-bonded magnet, can attain corrosion-resistance as good as that of conventional multi-layer resin coating. The powder material and resin are forced into the pores of the resin-bonded magnet, thereby effectively sealing the pores. The coating according to the present invention is more industrially applicable than the electro- or electroless plating which is conventionally carried out for corrosion-resistance of the bonded Nd-Fe-B magnet.

Conventionally, plating is carried out for the corrosion-prevention of the sintered Nd-Fe-B magnet. Before the plating, a pre-treatment is necessary. Since the plating coating usually has pinholes, these pinholes directly reach the surface of the sintered Nd-Fe-B magnet. Corrosive media intrude therefore through the pinholes and reach the boundary between the plating layer and the surface of the substrate. The plating layer is therefore likely to peel, particularly, when the oxide layer remains on the surface of parts.

Contrary to the above described drawbacks of the plating on the sintered Nd-Fe-B magnet, the coating according to the present invention can be formed without pre-treatment of the parts. Conditions for forming the coating according to the present invention are less strict than those of the conventional plating. The powder-compacted layer according to the present invention stops almost all of the corrosive media which have passed through the overlying upper plating layer. The corrosive media does not therefore intrude up to the surface of substrate, and, therefore, the coating does not peel. Since the coating according to the present invention is strongly bonded on the surface of the substrate, when its material is appropriately selected taking into consideration the material of the overlying plating layer, the plating layer can be very strongly bonded on the sintered Nd-Fe-B magnet.

Conventionally, an electroless plating layer is applied on the surface of the resin-bonded Nd-Fe-B magnet. Generally speaking, the electroless plating liquid is expensive and the cost of treatment of waste liquid is considerable. Bonding strength of the electroless plating layer with the underlying material is seriously lower than that of the resin coating. It is, therefore, difficult to make the electroless plating layer thick and it is generally limited to a thin one 5 um or less. Since the resin-bonded magnet is porous, the pinholes present on its surface are profiled in the electroless plating layer to a form very porous layer. The coating according to the present invention formed on the resin-bonded Nd-Fe-B magnet is advantageous over the conventional electroless plating layer from the points of view described for the sintered magnet.

Method for Forming a Coating

The features of the inventive method as compared with the conventional methods for forming the powder coating are first described.

The resin layer is first formed on the work piece. Thickness of the resin layer depends on the charging sequence of the powder material, resin, the coating forming mediating means, and work pieces, and stirring method. For example, when the resin and powder material are simultaneously charged, since the contact of the powder material and resin simultaneously occurs, the layer of resin alone formed on the surface of work piece becomes so thin as to be detected by the naked eye.

Subsequent to the formation of resin layer, the powder material is captured and fixed on the resin layer due to its adherence force. The powder material is firmly captured by the resin layer when it is cured on the surface of a work piece. The means for mediating the coating formation (hereinafter referred to as "the coating-forming means"), which are subjected to vibration or stirring, impart the striking force to the powder material which is also subjected to vibration or stirring. The powder material is therefore forced in between the particles of powder which have already been captured. The powder material is therefore further strongly fixed by the striking force of the coating-forming force in addition to the adherence force of resin. Since the work pieces collide with each other, the powder material is furthermore forced into the resin layer. The powder material mixed with the resin layer increases more and more, while the resin layer thickens and grows.

The powder material is also subjected to the striking force of the coating-forming means and the particles collide with each other on the surface of the work piece. The powder material therefore plastically deforms, and friction between the powder particles occurs. Due to mainly the plastic deformation and auxiliarily the inter-atom diffusion by the friction heat, the bonding force is generated. Ductile metal or alloy, such as Al, Cu, Zn, Sn, Au, Ag, Pb and their alloys, as well as plastics plastically deform into the form of platelets, which are pressure-bonded. The materials in the coating are therefore strongly bonded.

The coating-forming means are impinged upon the coating and squeeze the resin from spaces between the powder particles. The so-squeezed resin exudes on the coating surface. Part of such resin adheres on the coating-forming means. The resin adhered on the coating-forming means again adheres on the work piece, when such means are impinged on the surface of the work pieces.

The growth of coating proceeds while the resin is squeezed out from the coating. While the coating grows, the proportion of powder material in the coating surface increases. The powder material on the surface part of the coating coagulates under the striking force, so that the proportion of resin more and more decreases, and, hence the growth speed of coating decreases.

The following requirements (a)–(d) are necessary for realizing the process of film formation as described above.

(a) Resin must be locally or as a whole in an uncured condition at least in the initial period of the film-forming process. If the resin is as a whole cured in the entire film-forming process, the powder material, work pieces, and coating-forming means, (which may be hereinafter collectively referred to as "the coating-forming mixture"), are merely mixed but does not result in the coating formation. The word "uncured" indicates that resin is softer than resin of the coating, after vaporization and/or curing of its solvent is completed, and which is prepared for use.

(b) The coating-forming mixture must be vibrated or stirred. That is, also the coating-forming media must be vibrated or stirred. The work pieces can be stationary, provided that the other coating-forming mixture is brought into contact with the work pieces during mixing, and, further, the surface of the work pieces is subject to the impact force of the powder material impinging thereon.

(c) The coating-forming means generates the striking force but essentially does not become the component of the coating. When the coating-forming means is greater than the work pieces, the striking force of such means is not uniform on the surface of the work pieces. When the coating-forming means is smaller than the powder material, the former is captured in the coating, The size requirement of the coating-forming means is therefore essential. However, several greater coating-forming means than the powder material may be included in the coating-forming means, less than such an amount that: they do not impede the function of the smaller coating-forming means; they do not impede formation of coating on the inner surface of a ring-form work piece or the corners of work pieces; and, their striking force is so great as to destroy the work pieces and to roughen the coating surface.

The coating-forming means is usually spherical. The spherical coating-forming means is desirably 0.3 mm or more desirably 0.5 mm or more in diameter. In accordance with this rule, the size of the coating-forming means having another shape is determined. Smaller coating-forming means than the work pieces means that, when the volume of each means is converted to the volume of a sphere, its diameter is smaller than the largest diameter of the work pieces. The size of the coating-forming means is, however, desirably 50 mm or less, more desirably 20 mm or less, even in a case where the work pieces are long or large-sized. Requisite striking force can be produced, when the coating-forming means is greater in average size than the powder material. Material of the coating forming means should satisfy the following requirements (1) and (2): (1) Such great shape deformation of the coating-forming means as to be detected by the naked eye after the coating formation does not occur due to plastic deformation. In addition, elastic deformation during the coating formation is not excessively great. This requirement is not satisfied by soft rubber. (2) Neither breaking into pieces, cracking nor abrupt wear occurs. Some wear may occur during long use of the coating-forming means.

The coating-forming means may consist of more than one kind of material. It is possible to cover alumina balls, whose specific weight is low, with other materials so as to adjust the hardness of the coating-forming means. In this regard, plating layer, cured resin layer, uncured resin layer and/or volatile liquid layer may be formed on the coating-forming means. Such resin layer and the like promotes uniform deposition of powder on the work pieces. The resin layer and the like also mitigate the striking force of the coating forming means, thereby lessening the breakage of the work pieces and coating-forming means, cracks and wear due to friction. It is preferred to form the resin layer and the like, when the coating-forming means are very hard, large, and/or irregularly shaped.

(d) The powder material must be smaller than the coating-forming means so as to incorporate the former into the coating. The properties of the powder material are not at all specifically limited. However, when the powder material is resin, it must be harder than the resin film on the work pieces during the coating-forming process, so that the resin powder is buried under the striking force of the coating-forming means into the uncured resin film. The powder resin, which is completely cured, is preferred, because it provides the coating with excellent corrosion resistance.

Preferred embodiments of the present invention are described hereinafter.

Preferably, resin in an uncured state is liquid or semi-liquid, since the resin should be uniformly extended on the surface of the work pieces. It is possible to dissolve, dilute or disperse the liquid or solid resin in such dispersing means as an organic binder or water, so as to enhance fluidity and to uniformly spread the resin on the work pieces. Since the solvent or water vaporizes during mixing, the viscosity gradually increases, with the result that the powder adheres to the work pieces. It is preferred that the amount of solvent or dispersing media is adjusted to such a level that, as a result of their vaporization, the amount of resin becomes 20% by weight or more during vibration or stirring. When the concentration of resin is low during the vibration or stirring, the viscosity of resin is too low to attain the powder deposition.

Thermoplastic resin may be heated to enhance the fluidity and viscosity and then used. Powder resin may be used alone without dispersing in the solvent. In this case, the fluidity of the resin is poor. In order to uniformly disperse such powder resin in the coating-forming means, no particle of the powder resin in the coating-forming means, no particle of the powder resin should exceed the size of the coating-forming means.

The work pieces may contain resin, such as the resin-bonded magnets and plastic parts do. In this case, any solvent of this resin may be added to the coating-forming mixture so as to dissolve away the resin on the surface of the work pieces and to feed the resin into the coating-forming means. The once dissolved resin increases its viscosity during mixing or stirring and then adheres to the work pieces to form a resin film. Furthermore, the parts containing resin may be preliminarily treated with solvent to provide viscosity and hence to form an uncured resin layer on the surface of the work pieces.

The powder material is usually in the range of from 0.05 to 500 $\mu$m. The smaller size is preferred for a hard and difficult-to-deform powder, such as ceramic powder, while the greater size is preferred for ductile powder, such as metal powder. Known pigment such as carbon black from 0.01 to 0.05 $\mu$m in size may be used alone or in combination with the other powder material. The size of powder material is preferably from 0.1 to 300 $\mu$m, preferably from 0.1 to 100 $\mu$m, and ideally from 0.1 to 50 $\mu$m. The finer the powder material is, the more likely it is to be captured by uncured resin, forced into the space between the powder particles dispersed in the resin layer, and bonded with one another and with the work piece due to the plastic deformation. Therefore, the finer the powder material is, the smaller the striking force is and the surface roughness is lessened.

The coating-forming means can be made of iron, carbon steel, other alloyed steel, copper, copper-alloy, aluminum, aluminum-alloy, other metals and alloys, ceramics such as $Al_2O_3$, $SiO_2$, $TiO_2$, $ZrO_2$, SiC and the like, glass, and hard plastics Hard rubber may be used provided that it is hard enough to impart a satisfactory striking force. Sizes or materials of the coating-forming means may be varied in a particular coating-forming mixture. Occasionally, the above materials may be surface-treated or surface-coated and then used. Soft media, such as wood powder, soft rubber or plastics may be mixed with the above described coating-forming means in a volume ratio of 50% or less. The soft means can mitigate and uniformize the strking force of the coating-forming means, can attain uniformity of the coating and lessen the variance of the coating thickness.

The coating-forming means can have such various shapes as spherical, elliptic, cubic, trigometric frustrum, cylindrical, conical, trigometric prism, pyramid, rhombohedral, and irregular.

The components or elements of the coating-forming mixture are determined to provide a proportion which does not incline toward any one function of the elements. The amount of the powder material and resin is determined by the thickness of the coating and the surface area of the work pieces. It is preferred that the proportion of the resin and powder material as components of the coating-forming mixture provides 0.5% by volume or more of resin in terms of cured resin.

Sequence of loading the components of the coating-forming mixture is preferably such that the coating-forming means are mixed in a container by vibrating or stirring, and, then, the work pieces, powder material and resin are succesively or simultaneously loaded in a container, in which the coating-forming means are mixed. When the coating-forming means are preliminarily loaded in a container and subjected to vibration or rotation, as soon as the other coating-forming mixture is loaded in a container, the resin adheres to the work pieces and the requisite striking force is generated.

According to an alternative method according to the present invention, a resin film is preliminarily formed on the work pieces and then, the coating-forming means, the powder material and the work pieces are subjected to vibration of stirring. This method is different from the above described method in the fact that the work pieces have the resin film which is at least partially uncured at least during the initial period of the coating formation. The powder material is captured by this resin film as is described for the capturing by the resin film formed by the resin as one of the components of the coating-forming mixture. The coating film of the alternative method can be formed by various methods, such as spraying liquid resin, solid or liquid resin dispersed by solvent, or the like onto the work pieces. Alternatively, the work pieces are dipped in the liquid resin or the like mentioned above. Thermosetting resin may be dispersed on the heated work pieces. When the work pieces are resin-bonded magnet or plastic parts, the work pieces can be dipped into the solvent and then lifted, thereby dissolving the resin on the surface of the work pieces and simply forming the resin film mentioned above. Advantageously, the alternative method mentioned above enables the formation of a resin film on the entire surface of the work pieces, and a decrease to the lowest level in the amount of resin deposited on the coating-forming means. Powder material may be dispersed on the resin film which is preliminarily formed on the work pieces.

The resin may be cured during vibration or stirring, thereby enhancing the fixing force of the resin which is captured in the resin film. The curing method may be curing at normal temperature using two-part mixing resin, heating a heating-curing type resin, vaporizing solvent, or irradiation of ultraviolet ray, gamma ray, electron ray or other radiation rays.

Specific order of loading the coating-forming mixture is preferred in the following cases (1) and (2). Case (1): Resin powder is used together with liquid resin, solvent, or resin dissolved in solvent. When the powder resin is preliminarily mixed with the liquid resin and the like, and, when the resin powder is likely to dissolve in the liquid resin and the like, the resin powder so dissolves and forms the powder-compacted layer with difficulty. The powder resin should therefore be added to the coating-forming mixture at a late stage. Alternatively, when the powder resin is added from the beginning, the liquid resin and the like are subsequently added at the same time as the addition of the work pieces. Case (2) Any one component of the coating-forming mixture is heated. In this case, any one of the following methods is preferably used. The work pieces are heated and then loaded in a container, followed by loading the resin in the container. The resin and, then the heated work pieces are loaded. The heated work pieces and heated coating-forming means are loaded in the container, followed by loading resin.

The coating-forming mixture without the powder material may be preliminarily mixed in a container and then the powder material may be mixed in a container and then the powder material may be loaded into the container. This method is advantageous in the following points (1)-(3). (1) When the resin is so diluted with solvent as to have a high fluidity, the resin is thoroughly and uniformly spread over the work pieces, thereby enabling the formation of a thoroughly uniform resin film and hence a uniform powder-coating. (2) The resin coating formed on the work pieces has such a distribution of components that the resin and powder contents are high at the boundary on the work pieces and the top of the coating, respectively. The proportion of these components varies continuously in the resin coating. The bonding strength of the resin coating is therefore high. (3) The powder material is forced onto the top of the coating at a proportion as high as from 40 to 80% by volume, exceedingly greater than the pigment proportion in the paint. When the powder material is one of $TiO_2$, $MgO$, $Fe_2O_3$, and other pigments of paint, the coating according to the present invention exhibits excellent shielding performance against water and other corrosive media as compared with that of the resin coating. Conventionally, in order to attain heavy corrosion proofing for paint coating, a multi-layer painting is carried out to increase the pigment amount. However, not only is such painting complicated, but also the so-formed coating is liable to peel between the layers and is disadvantageously thick. The single-step method described above is advantageous and can form a thin coating.

When a resin (hereinafter referred to as "the first resin") coating is preliminarily formed on the work pieces according to one of the methods of the present invention, resin (hereinafter referred to as "the second resin"), which is of the same kind as or a different kind from the first resin, may be added to the coating-forming mixture. The second coating flows on the resin coating, which is already formed on the work pieces, and forms a layer, which then grows and brings about the bonding between the powder material and resin. The second resin may be the one diluted with solvent. The amount of the second resin is preferably 0.05% or more, because the second resin in an amount smaller than this makes the deposition of powder material on the work pieces poor.

The proportion of the volume of the coating-forming means to the work pieces is dependent upon the shape of the work pieces. The coating-forming means is preferably 20% or more, preferably 50% or more in terms of apparent volume ratio. Otherwise, the work pieces are not subjected to uniform striking force and, hence, a good coating is obtained with difficulty.

It is possible to form a single layer of the coating by any one of the methods described above and then to form another or other layers of the coating by any one of the methods described above. The so-formed multi-layer coating can be as thick as from 10 to 300 μm, thereby furthermore utilizing the properties of the powder material as opposed to those of the single-layer coating. Any defect, such as pinholes, formed in the first layer can be repaired by the second or subsequent layer. The parts exposed to brine are very corrosion-resistant, when three or more layers are formed.

Other preferred embodiments, which can be found in the present invention are now described.

(1) An opening hole(s) is formed in a container at its bottom or side portion, a work piece is passed through the opening hole(s) in such a manner that the part to be coated is exposed in the container. The work piece is displaced relative to the container so that the coating according to the present invention is formed on the work pieces. This method attains a continuous formation of the coating on long parts, wires or sheets.

(2) After forming the single or multi-layer coating on the work pieces, the resin of the coating is cured. The coating is thus strengthened and the loss of powder is prevented. The curing is carried out by means of heating the coating in or outside of the container to the curing temperature of resin. Alternatively, the solvent may be vaporized by allowing it to be exposed at the ambient temperature. The curing may be carried out by irradiating the coating with gamma ray or electron beam, depending upon the kind of resin.

(3) After forming the coating on the work pieces, free powder remaining on the work pieces is removed. The powder material may occasionally be loose and remain on the work pieces. Such powder material should be removed when the work pieces treated by the method according to the present invention are to be used for an electronic, electric or precision machine, to which the dust or particles are halmful. The powder material is therefore preferably removed by ultra-sonic cleaning or blowing air. The free powder can be removed either before or after curing the resin.

The free remaining powder can be removed by subjecting the surface of the work pieces to friction by soft media. Soft media and the work pieces are mixed in a container by imparting the vibration or stirring. By this method shear force is generated between the soft media and the work pieces so that the free powder is removed and the surface of the coating is polished. This method is more effective for powder removal than ultra-sonic cleaning, and also provides a beautiful finish. This method is therefore appropriate for parts used as ornamental or decorative pieces. The soft media is preferably one that absorbs impact somewhat and hence does not impart such a strong striking force to the work pieces that they are damaged or deeply scratched. Preferred soft media are wood chips, shavings and sawdust, walnut shells, soft plastics and rubber. The wood chips may be impregnated with oil so as to enhance the surface-polishing effect of the soft media and rust-proofing of the work pieces.

(5) The work pieces, on which the coating is formed, are heat treated. One of the objects of the heat treatment is to cure the resin. The curing temperature of resin is dependent on the resin but is usually in the range of from 30° to 200° C. The curing time is usually from 1 to 500 minutes. Another object of the heat treatment is to induce diffusion between the work pieces and the powder material and hence to increase the bonding strength. Another object of the heat treatment is to lessen the number of pinholes and to make the coating as continuous as possible. Still another object is to homogenize the coating and to improve the corrosion resistance and mechanical properties. When the heat-treatment temperature is higher than the melting point of the powder material, the powder material melts, resulting in melt-sagging and bonding of the work pieces. The heat-treatment temperature is less than the melting point of the powder material. Since the temperature of heat treatment having the objectives as described above, is usually higher than the decomposition temperature of resin, the coating consists essentially of the powder material after the heat treatment. When the coating is heat treated, the resin is preferably one that easily decomposes and vaporizes and does not leave carbon and the like in the coating. Preferable resins are paraffin, polypropylen, and various waxes. The proportion of resin before the heat treatment is preferably as small as possible, for example 50% or less. When the powder material used has a relatively low melting point, such as Sn, Zn or its alloy, heat-resistant resin such as phenol fluorine or silicone resin, or inorganic binder may be used. Such resin or the like remains in the coating in a relatively high amount after the heat treatment.

The heat treatment is advantageous when the powder material has a relatively low melting point, such as Zn, Sn or its alloys. Such metal prevents corrosion of almost all metals by the sacrificing corrosion-preventing effect. In order to fully realize this function, the coating is necessarily virtually continuous. Corrosion prevention under severe conditions such as under rain water or brine water could be provided by the heat treatment described above. Conventionally, the Zn or Sn coating is formed by electro-plating or hot-dip galvanizing. The former method is wet process, which incurrs the treatment of waste liquid and by-products. The coating by the latter method is 100 μm or more, and, therefore, the thin coating is not obtained. The latter method is not appropriate for forming a coating on small parts. Contrary to this, the method according to the present invention is a dry method, simple, and enables the formation on small parts a coating as thin as from 0.1 to 100 μm.

(6) The work pieces, on which the coating is formed, is further coated with resin which is the same kind as or different from that of the coating. Since the top of the coating formed by the method of the present invention contains a smaller amount of powder material than its inner part, the powder material may be removed from the coating or the coating may be locally destroyed when the coating is subjected to impact or strong force from outside during handling of the parts or their fitting in a machine. The resin which is further coated on the work pieces subjected to the coating process of the present invention prevents the powder removal and damage of parts as described above. It also fills the pinholes so that it enhances the corrosion resistance against water and strength of the entire coating. This method is advantageous for applying to the work pieces which are not heat treated.

The top resin coating described above can be formed by spraying or dipping the work pieces in the resin. It can also be formed by modifying the method of the present invention; that is, the powder material is not used for the coating-forming mixture. A thin and uniform top resin coating is formed by such modified method under the function of coating-forming means. The top resin coating may be a conventional paint coating with pigment, which provides a beautiful appearance.

In addition to the protective coating by the resin, the metal or alloy plating as well as dispersing plating of metal and non metallic material may be applied. Heretofore, when the substrate material is electro-insulative, such as plastics and ceramics, or when the substrate material has poor electro-conductivity such as resin-bonded magnets, and is not uniform, direct electro-plating on the substrates is difficult. A complicated and expensive pre-treatment, e.g., an electroless plating, is necessary before such electro-plating. Contrary to this, electro-plating on the coating according to the present invention is easy, since it is a metal-rich layer firmly bonded on the work pieces.

According to the conventional plating methods, plating on some materials is difficult because they have a detrimental chemical reaction with the electrolytic liquid. One example of such materials is the one produced by the powder metallurgical process. Since such material has pores, the plating liquid penetrates even into the pores of the material and causes undesirable corrosion or electro-deposition in its interior. When the powder metallurgical material is subjected to the coating formation according to the present invention and then to the plating, the plating coating can be easily formed. This method is more advantageous than the known method of physical vapor deposition (PVD) followed by plating, from the view point of investing cost. The plating layer formed on the coating according to the present invention may include pinholes. In this case, the plating layer is thickly formed or electroless plating layer is formed on the coating according to the present invention, followed by plating.

BRIEF DESCRIPTION OF DRAWINGS

FIGS. 8 through 31 are photographs showing the skeleton structure according to the present invention.

Preferred embodiments are further described with reference to the drawings.

The vibration or stirring in a container can be carried out by various methods as illustrated in FIGS. 1 through 9.

Figure 1:
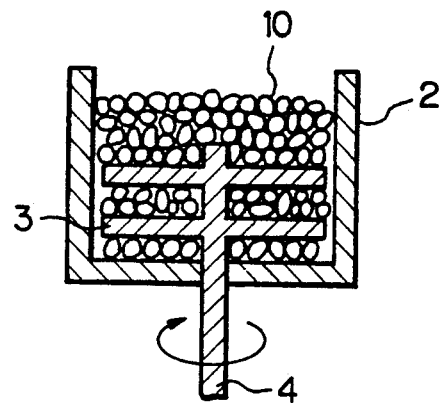
FIGS. 1 through 17 illustrate preferred embodiments of the method according to the present invention.
Figure 2:
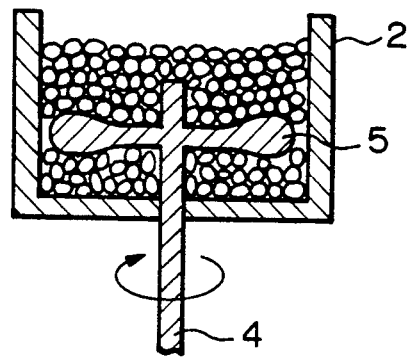
Figure 3:
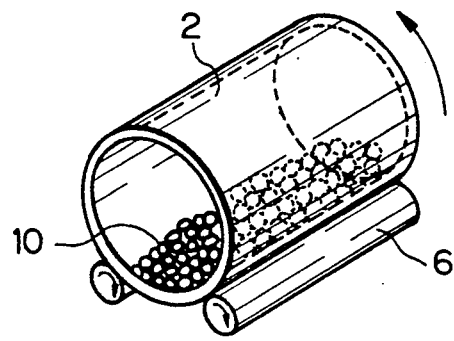
Figure 4:
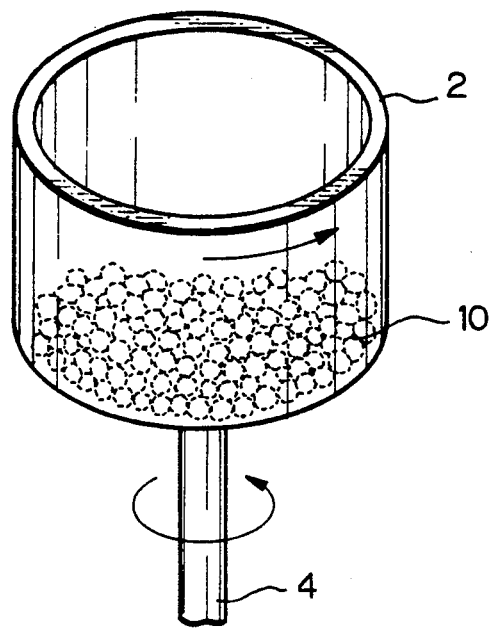
Figure 5:
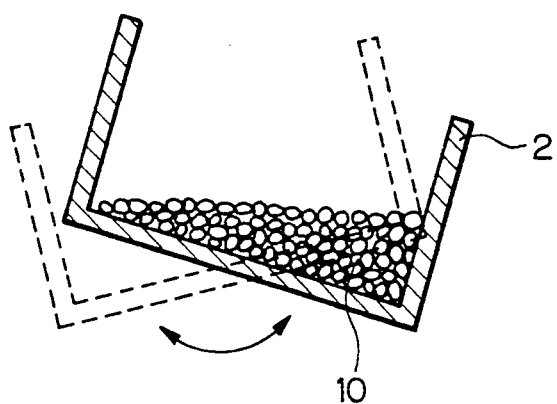
Figure 6:
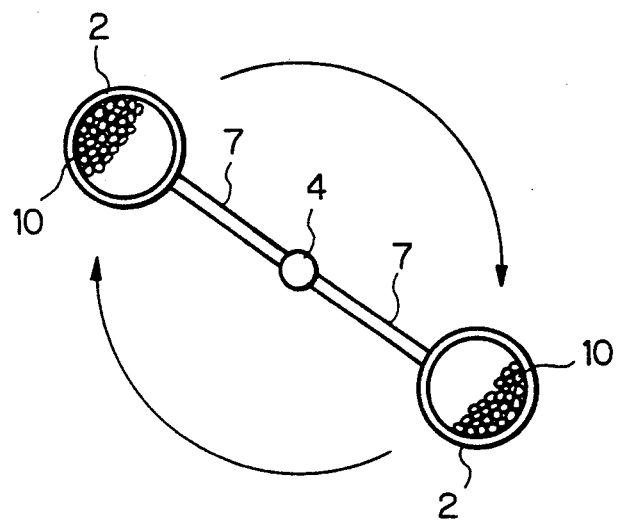

An arm secured to a rotary shaft 4 installed in a container 2 (FIG. 1), blades 5 (FIG. 2) secured to a rotary shaft 4, and an impeller, blades or the like of a stirrer may be used. The coating-forming mixture is denoted in the drawings by reference numeral 10. In addition, a container in the form of a drum or pot may be rotated on a roller 6 shown in FIG. 3. As is shown in FIG. 4, a container in the form of a drum may be fixed to a rotary shaft and be rotated. The top of the container may be opened or closed. A container 2 may be shaken as shown in FIG. 5. During shaking, stirring may be carried out. Furthermore, arms 7 (FIG. 6) may be symmetrically secured to a rotary shaft 4, and the containers 2 fitted onto the front ends of the arms. The coating-forming mixture is loaded in the containers 2 and is subjected to centrifugal force to mix the same. Preferably, the containers 2 rotate around their axes. The container may be embodied as a holder in the form of a disc.

Figures 7A, 7B:
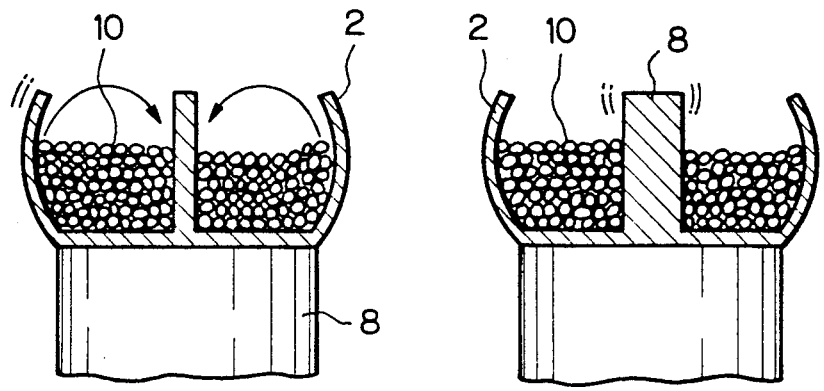

A vibrator 8 may be provided in or outside of a container 2 so as to impart the vibration to the coating forming mixture as shown in FIG. 7.

The force imparted to the coating-forming mixture is hereinafter described with reference to an example of vibrating the mixture. This force is hereinafter referred to as the vibrating force. The vibrating force is divided by the sum of weights of the container and coating-forming mixture (this sum being referred to as "the vibrating weight") so as to define the vibrating ratio in arbitrary units. This vibrating ratio is an index indicating the impact force which is generated by the coating-forming mixture and is imparted to the work pieces. According to a specific example, a container has a volume of 2.8 liter and weight of 1 kgf, the coating-forming means are steel balls 10 kgf in weight, and the work pieces are 1 kgf in weight. The vibrating weight is 12 kgf. Preferred vibrating force in this example is from 20 to 50 kgf at 40Hz period. The vibrating ratio is therefore from 1.67 (=20/12) to 4.17(50/12). According to another specific example with a greater container, a container has 20 liter in volume and 4.5 kgf in weight, the coating-forming means are steel balls of 70 kgf in weight, and the work pieces are 5.5 kgf in weight. The vibrating weight is 80 kgf. Preferred vibrating force in this example is from 150 kgf at 25Hz period. The vibrating ratio is therefore 1.88 (=150/80).

When tough work pieces, such as steel work pieces, are treated, the vibration ratio may be 10 at the highest. However, when brittle work pieces, such as rare-earth magnets, bonded magnets, ceramics and glass, are treated, the vibrating ratio is preferably 5 at the highest. The vibrating ratio is preferably 1, more preferably 1.5 at the lowest. When the vibrating ratio is less than this value, the growing speed of the coating becomes late. On the other hand, when the vibrating ratio is more than the above described value, brittle work pieces are liable to be destroyed, and the coating-forming means are liable to deform. The vibrating frequency is not at all limited but is preferably in the range of from 2 to 200Hz. An amplitude of from 0.5 to 10 mm enables the provision of the above described vibrating ratio.

In the stirring case, the rotation takes place and centrifugal force is generated. In calculating the vibrating ratio, the centrifugal force is converted to the vibrating force under the calculation described above. The thus calculated vibrating ratio is preferably within the ranges described above.

Figure 8:
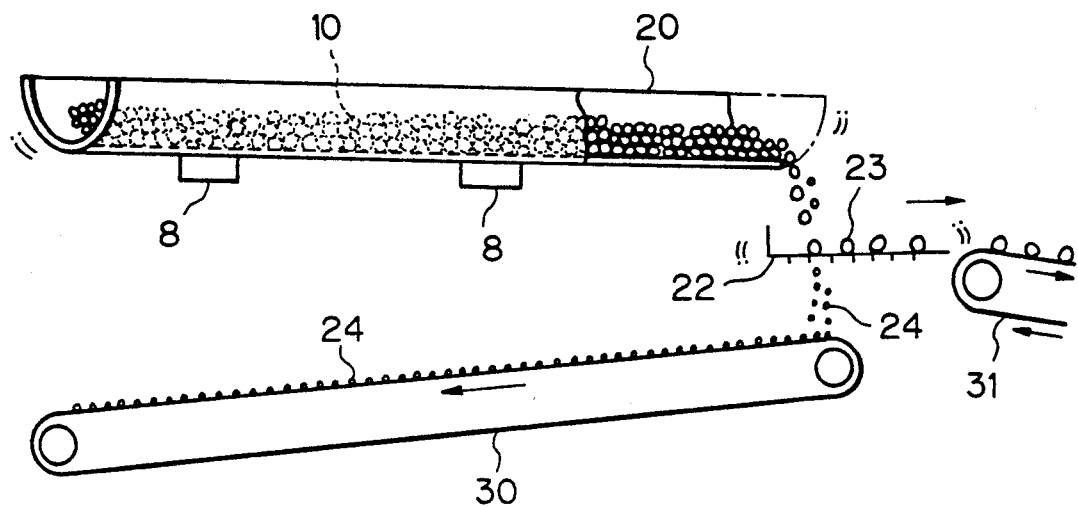
Figure 9:
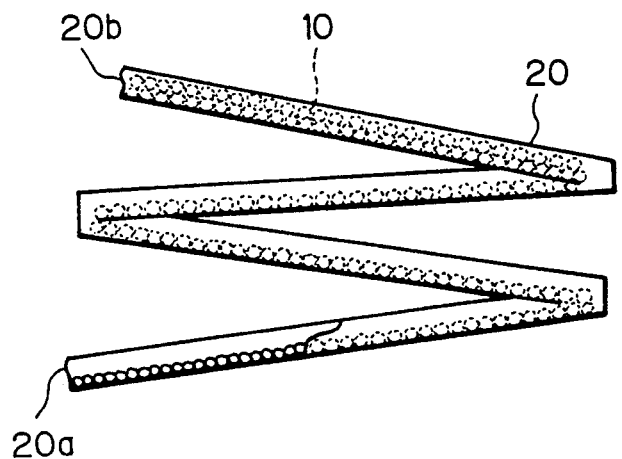

Vibration may be carried out by using an apparatus shown In FIG. 8. A U-shaped trough 20 is disposed aslant preferably at an inclination of from 1° to 20° and is attached to the bottom of a vibrator 8. The coating-forming mixture 10 is caused to slide down along the trough 20, while being vibrated. The cross section of the trough 20 is not limited to a U-shape but may be variously shaped, such as circular, V shaped or rectangular. The upper part of the trough 20 may not be open. A vibrating sieve 22 is located beneath the lower end of the trough 20. The vibrating sieve 22 comprises a mesh smaller than the work pieces 23 and greater than the coating-forming means such as steel balls 24, and a frame, to which the mesh is fixed. The steel balls 24 fall therefore on and then through the vibrating mesh 22, while the work pieces 23 fall on the vibrating mesh 22 and are then conveyed together with the vibrating mesh 22. The steel balls 24 are collected by a conveyer 30 located below the vibrating mesh 22 and are then used again for forming the coating. The work pieces 23 are collected by a conveyer 31 located at the lower end of the vibrating trough 22. The coating formation can be carried out in a continuous and automatic manner. The trough 20 may be arranged in a zigzag or spiral pattern as shown in FIG. 9. This arrangement reduces the space occupied by the trough. Although not shown in the drawings, the entire trough may be located in a container, which is vibrated.

When relatively large parts or sheets are to be coated, the methods described hereinafter are preferred.

Figure 10:
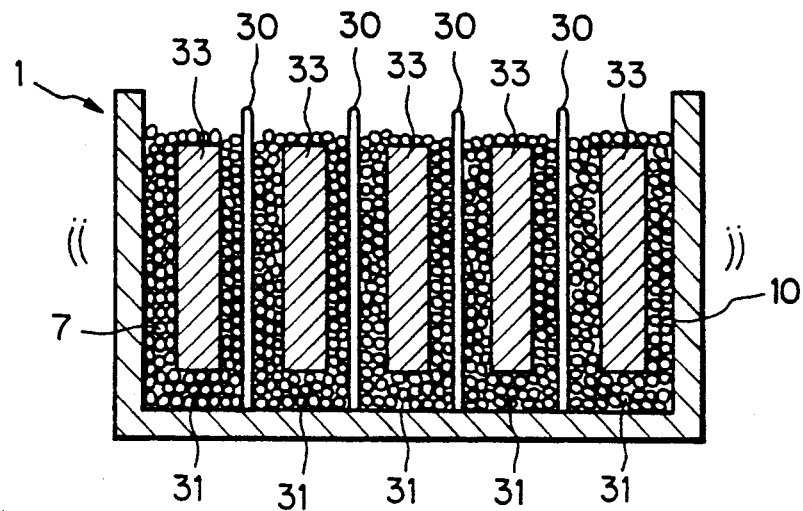
Figure 11:
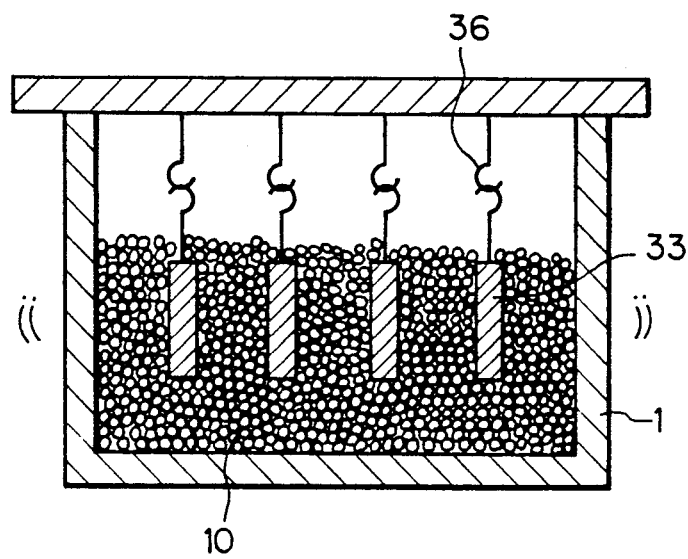

A container 2 shown in FIG. 10 is separated by parting plates 30 to form the regions 31, into which the parts 33 are loaded. The container 2 is vibrated. When metal mesh is used instead of the parting plates shown in FIG. 10, the coating-forming means 7 freely pass through the mesh and move across the container space. The powder therefore uniformly spreads over the surface of the parts 33. Uniform coating can therefore be formed. In addition, as is shown in FIG. 11, the parts 33 may be suspended down into the container 2 by hangers 36.

Figure 12:
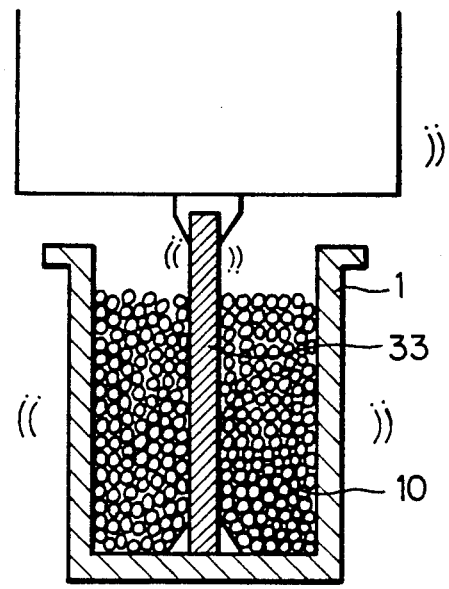
Figure 13:
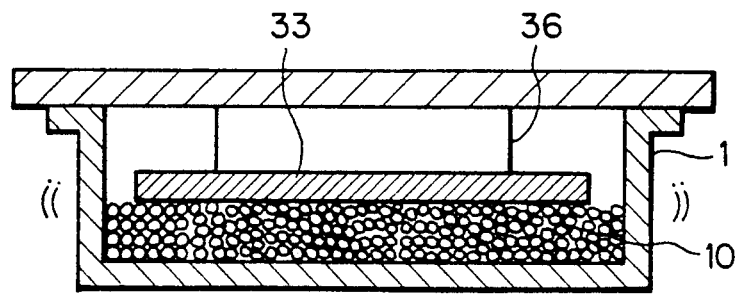
Figure 14:
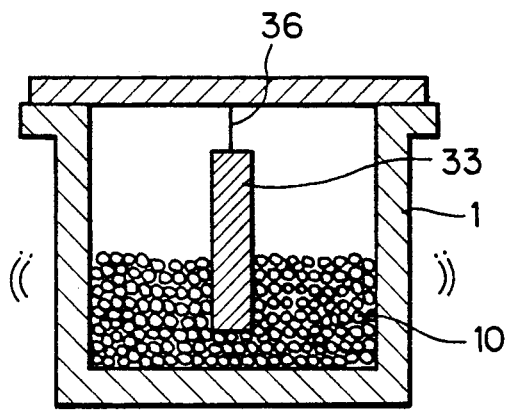
Figure 15:
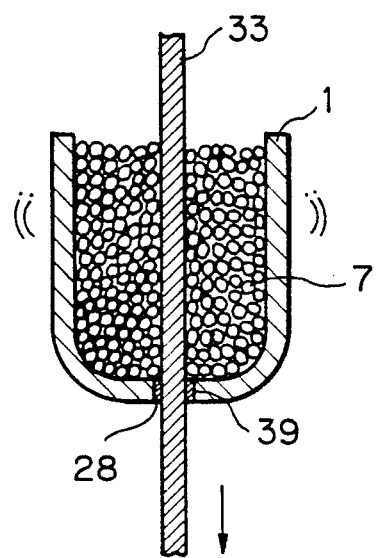

As is shown in FIG. 12, the parts are fixed in a container 1, and the container 1 and/or parts 3 are fixed to a vibrator 8, which directly or indirectly vibrates the parts 33. In addition, as is shown in FIG. 13, the parts 33 are suspended by a hanger 36 into a container 1, which is vibrated. Only one surface of the parts 33 is coated. Only part of the surface of the parts 33 can be coated when the parts 33 are put into the coating-forming means and powder as is shown in FIG. 14.

Resin may be applied on a part of the surface of parts by brushing or spraying on the parts selectively masked by a tape or the like. The parts thus applied with resin are subjected to the methods described above, so as to form the coating of the present invention on the resin-applied surface.

Hereinafter are described preferred methods for continuously forming the coating on a sheet, wire, rod, pipe or the like.

A long sheet, wire, rod or pipe is passed through the aperture 28 formed at the bottom of a container 1 and equipped with a packing 39. The coating-forming means are loaded in the container 1. Resin and powder material are then loaded, possibly continuously little by little, into the container 1 being vibrated. The long sheet or the like is tightly pulled downwards or upwards through the packing 39. A resin layer may be preliminarily formed on the work pieces 33, while only the powder and coating-forming means are loaded in the container 1.

Figure 16:
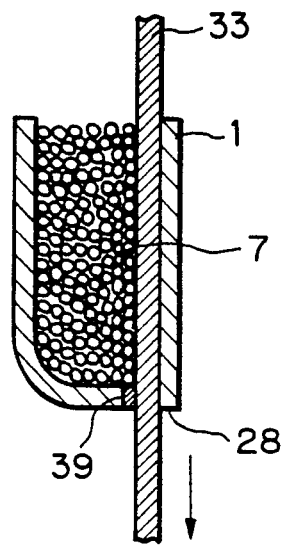
Figure 17:
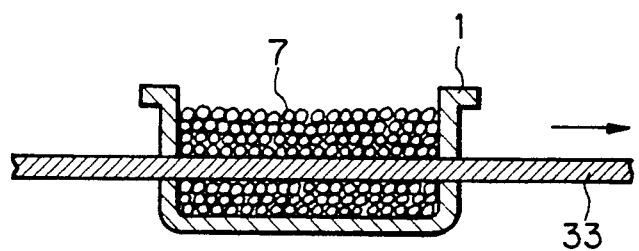
Figure 18:

Referring to FIG. 16, a part 33 is shifted to the one side of the container 1 so as to form the coating on the one side of a sheet. The parts 33 may be pulled from a container horizontally as shown in FIG. 17. A plurality of apertures 28 may be formed so as to enable a plurality of long parts 33, such as fine copper wires, to be pulled out continuously and effectively.

Cured or uncured resin or volatile liquid may be applied on the coating-forming means to form a film. When the coating-forming mixture including the coating-forming means is subjected to the vibration or stirring, the powder, which is deposited once on the coating-forming means, then deposits on the work pieces. The powder therefore deposits uniformly on the work pieces. In addition, edges of the work pieces are difficult to crack, the powder deposited on the work pieces is difficult to be removed from the work pieces due to collision by the coating-forming means. The film mentioned above promotes therefore uniform formation of the coating on the work pieces. In order to more positively utilize the function of the cured-resin film or the like, the coating-forming mixture except for the work pieces is preferably subjected to the vibration or stirring before loading of the work pieces, because amount of powder once deposited on the powder-coating means can be increased. The vibration and stirring condition may be the same as that described above.

According to a preferred embodiment of the present invention for forming an electro-conductive coating, such as a shield coating for EMI (electro-magnetic interference) prevention, the vibration or stirring is preferably carried out in a non-oxidizing atmosphere, e.g., inert-gas atmosphere (Ar, $N_2$ or the like) having a residual oxygen content of 10% or less, preferably 5% or less, ideally 3% or less. By this method, it is possible to provide 0.5 $\Omega/\square$ or less of surface electro-resistance, while the surface electro-resistance of the coating produced in air is as high as a few $K\Omega/\square$.

Figure 36:
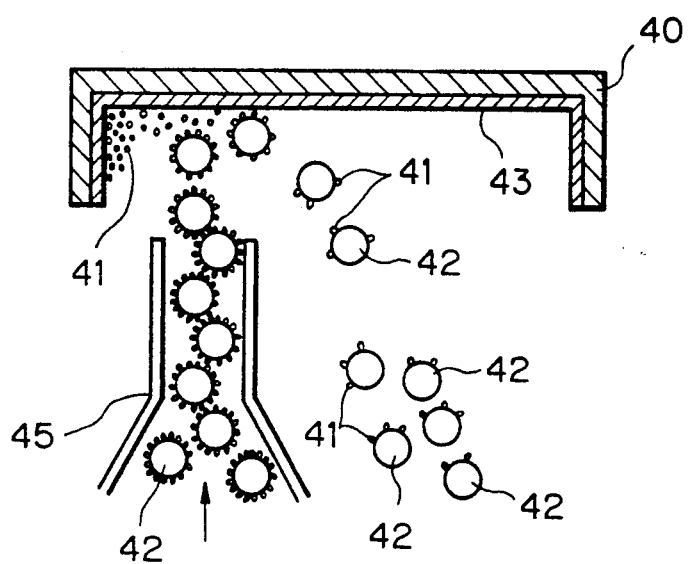
FIG. 36 illustrates a method for forming a coating having the skeleton structure.

It may be difficult to form the coating on the corners of a vessel's interior. The coating on such corners is important for an EMI prevention, since leakage of electromagnetic wave through the non-coated corners is detrimental as well. According to a preferred method for forming the coating having skeleton structure as shown in FIG. 36, uncured resin or other adhesive media is preliminarily deposited on the coating-forming means, such as steel balls 42. The powder material 41 is adhered on the uncured resin or the like. The steel balls 42 are projected through the nozzle 45. An uncured-resin layer 43 is preliminarily formed on the inner side of a vessel 40. When the steel balls 42 are impinged on the vessel 40, the powder material 1 is captured by and forced in the uncured-resin layer 43. The steel balls 42, from which the powder material 41 is separated, fall down. The steel balls 42 supplied from the nozzle 45 successively impinge, so that the powder material is further forced in the uncured-resin layer 43. The powder material is compacted to enhance density of the coating, in which the skeleton structure is therefore produced. Although not shown in FIG. 36, the powder material 41 and the steel balls 42 may be projected separately toward an identical part of the vessel 40. The projection may be carried out mechanically or by utilizing gas stream.

The present invention is hereinafter described with reference to the examples.

EXAMPLE 1

In order to facilitate the observation of a fracture surface of the coating according to the present invention, the coating is formed on a glass plate 30 mm×20 mm×2 mm in size. Steel balls 3.0 mm in diameter at a total amount of 10 kg were first loaded in a spherical pot 2.8 liter in volume and 150 mm in depth. Apparent filling density was approximately 5 kg/liter. While vibrations of 2500 cpm (cycle per minute) and 0.5 to 2 mm in amplitude were imparted to the pot, 20 g of $TiO_2$ powder with an average diameter of 0.3 $\mu$m was loaded in the pot. The vibration was continued for 15 minutes.

Figure 19:
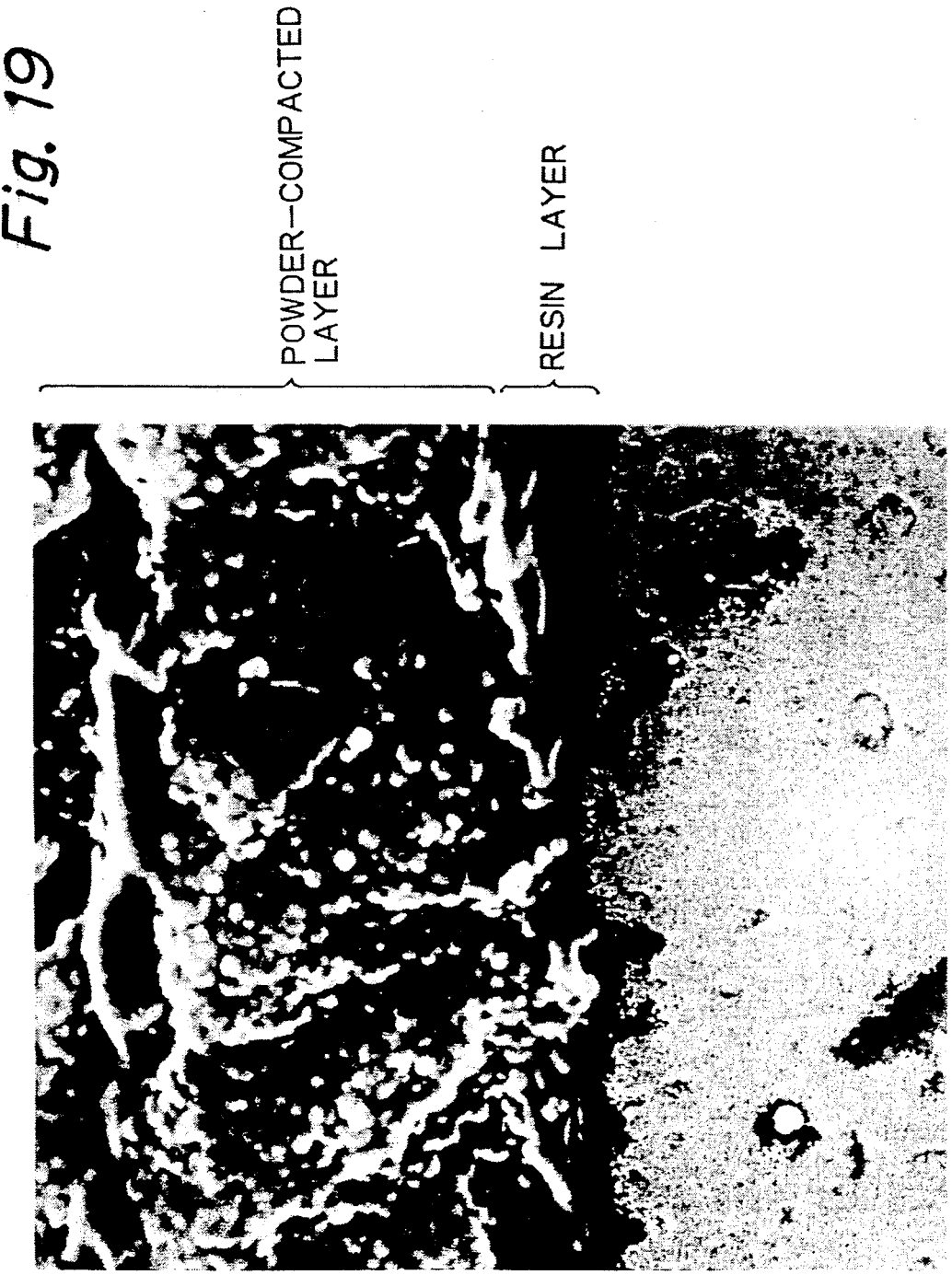
Figure 20:
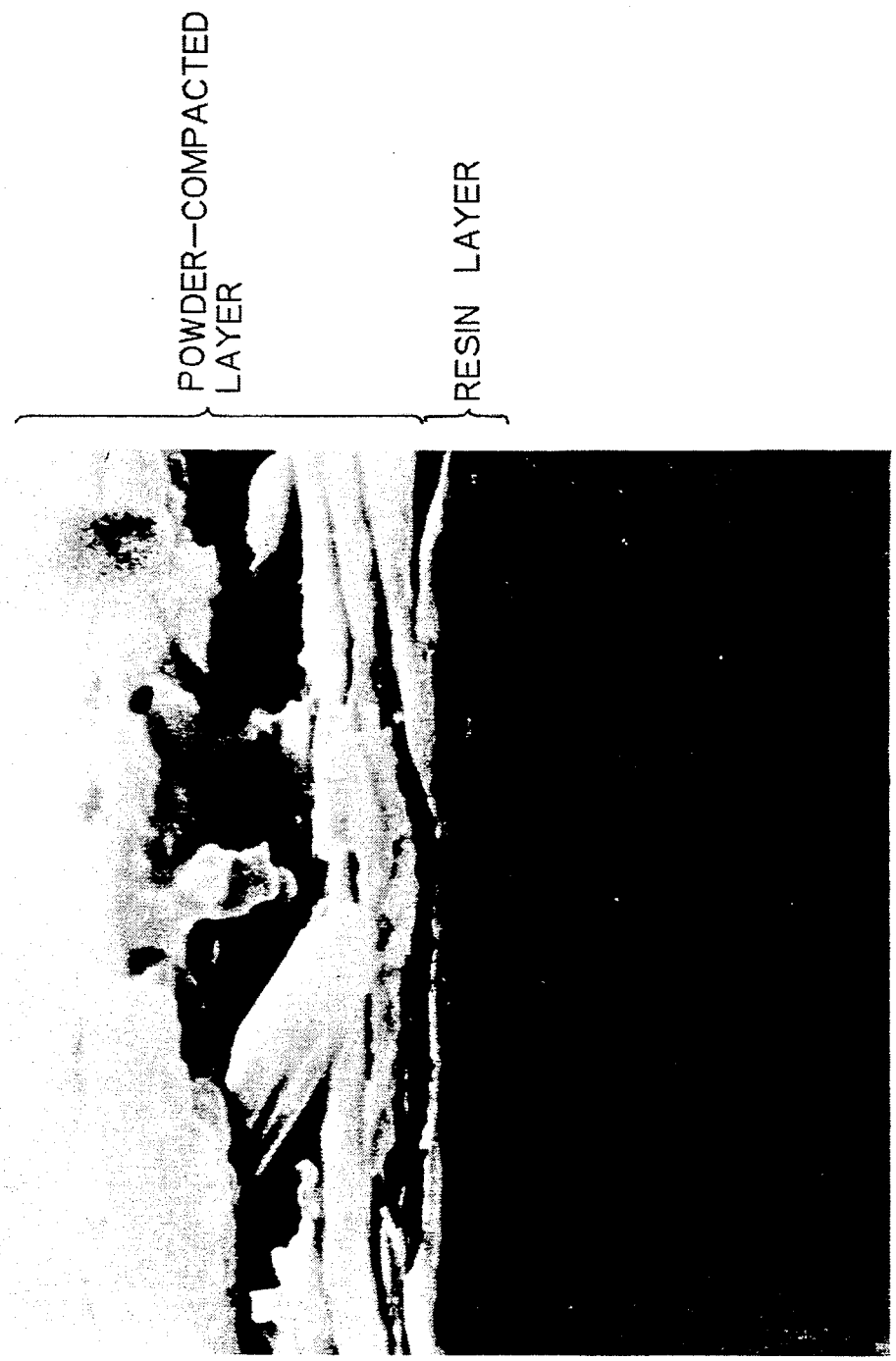

Twenty glass pieces were preliminarily dipped in methylethyl ketone (MEK), in which 10% of epoxy resin (94% of resin and 6% of curing agent) was dissolved. The glass pieces were thus coated with resin. The glass pieces were loaded in the pot and the vibration was carried out for 15 minutes. The glass pieces were then taken out from the pot. Heat treatment was carried out at 120° C. for 2 hours. The glass pieces were loaded in the container of the same size as described above together with 2.0 kg of walnut shells. Vibration was carried out for 5 minutes to remove the $TiO_2$ powder remaining unfixed on the glass pieces. The glass pieces were taken out of the pot and cleaved. The fracture plane was observed by an SEM. The SEM images at magnification of 4000 and 13000 are shown in FIGS. 19 and 20, respectively.

The resin layer and powder-compacted layer are 1.5 um and 15 um thick, respectively. As is shown in FIG. 19, the two layers are anchored to one another and an intricate border is formed between the two layers. The skeleton structure is clear from FIG. 20. That is, since the $TiO_2$ is particles with a fine diameter, the skeleton structure can be observed with a microscope at magnification of 1000 or more. In FIG. 20, the contour of the particles appears to blur, because the particles are covered with resin. The resin is filled in the interior of the powder-compacted layer. The powder is 40% by volume or more in the powder-compacted layer. In addition, when the samples were cleaved for the observation of the cross section, the powder-compacted layer fell off. Such fell portions appear in the photograph and do not reproduce the structure of the powder-compacted layer. Virtually no difference in the density of particle distribution is present in the powder-compacted layer as is clear from the photograph. The skeleton structure is disordered at the top middle portion and the bottom right portion of the powder-compacted layer. Cavities, which appear to be isolated pores, are formed in the disordered skeleton structure, and are filled with resin.

EXAMPLE 2

Figure 21:
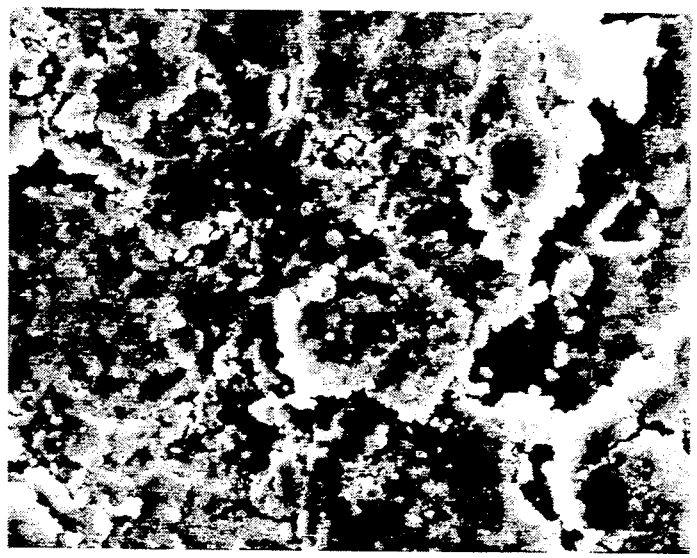

Steel balls 3.0 mm in diameter in a total amount of 10 kg were first loaded into a spherical pot 2.8 liter in volume and 150 mm in depth. Apparent filling density was approximately 5 kg/liter. While vibrations of 3500 cpm and 0.5 to 2 mm in amplitude were imparted to the pot, 20 g of atomized Al powder with an average diameter of 3 $\mu$m was loaded into the pot. Vibration was continued for 5 minutes. Twenty glass pieces were preliminarily dipped in methylethyl ketone (MEK), in which 10% of epoxy resin (94% of resin and 6% of curing agent) was dissolved. The glass pieces were thus coated with resin. The glass pieces were loaded into the pot and the vibration was carried out for 15 minutes. The glass pieces were then taken out from the pot. Heat treatment was carried out at 120° C. for hours. The glass pieces were loaded in a container of the same size as described above together with 2.0 kg of walnut shells with an average particle-diameter of 2 mm. Vibration was carried out for 5 minutes to remove the Al powder remaining unfixed on the glass pieces. The glass pieces were taken out of the pot and cleaved. The fracture plane was observed by an SEM. The SEM image of the cross section is shown in FIG. 20. The SEM image of the surface is shown in FIG. 21.

The resin layer and powder-compacted layer are 8 um and 1 um thick, respectively. The powder content is 50% or more by volume and is locally 70% or more by volume. The atomized Al powder is spherical. The Al powder in the powder-compacted layer is flat, and the peripheral shape is sharply edged. The skeleton structure is formed by the stacked flat pieces. The clearances between the flat pieces are partly filled with resin in the form of a layer.

EXAMPLE 3

Steel balls 3.0 mm in diameter in a total amount of 10 kg were first loaded into a spherical pot 2.8 liter in volume and 150 mm in depth. Apparent filling density was approximately 5 kg/liter. While vibrations of 3500 cpm and 0.5 to 3 mm in amplitude were imparted to the pot, 20 g of $TiO_2$ powder with an average diameter of 3 $\mu$m was loaded into the pot. Vibration was continued for 5 minutes. Twenty magnets were preliminarily dipped in methylethyl ketone (MEK), in which 10% of epoxy resin (94% of resin and 6% of curing agent) was dissolved. The magnets were thus coated with resin. The magnets were loaded into the pot and the vibration was carried out for 15 minutes. The magnets were then taken out from the pot. Heat treatment was carried out at 120° C. for 2 hours. The magnets were loaded into a container of the same size as described above together with 2.0 kg of walnut shells. Vibration was carried out for 5 minutes to remove the $TiO_2$ powder remaining unfixed on the magnets. The magnets were taken out of the pot.

Figure 22:
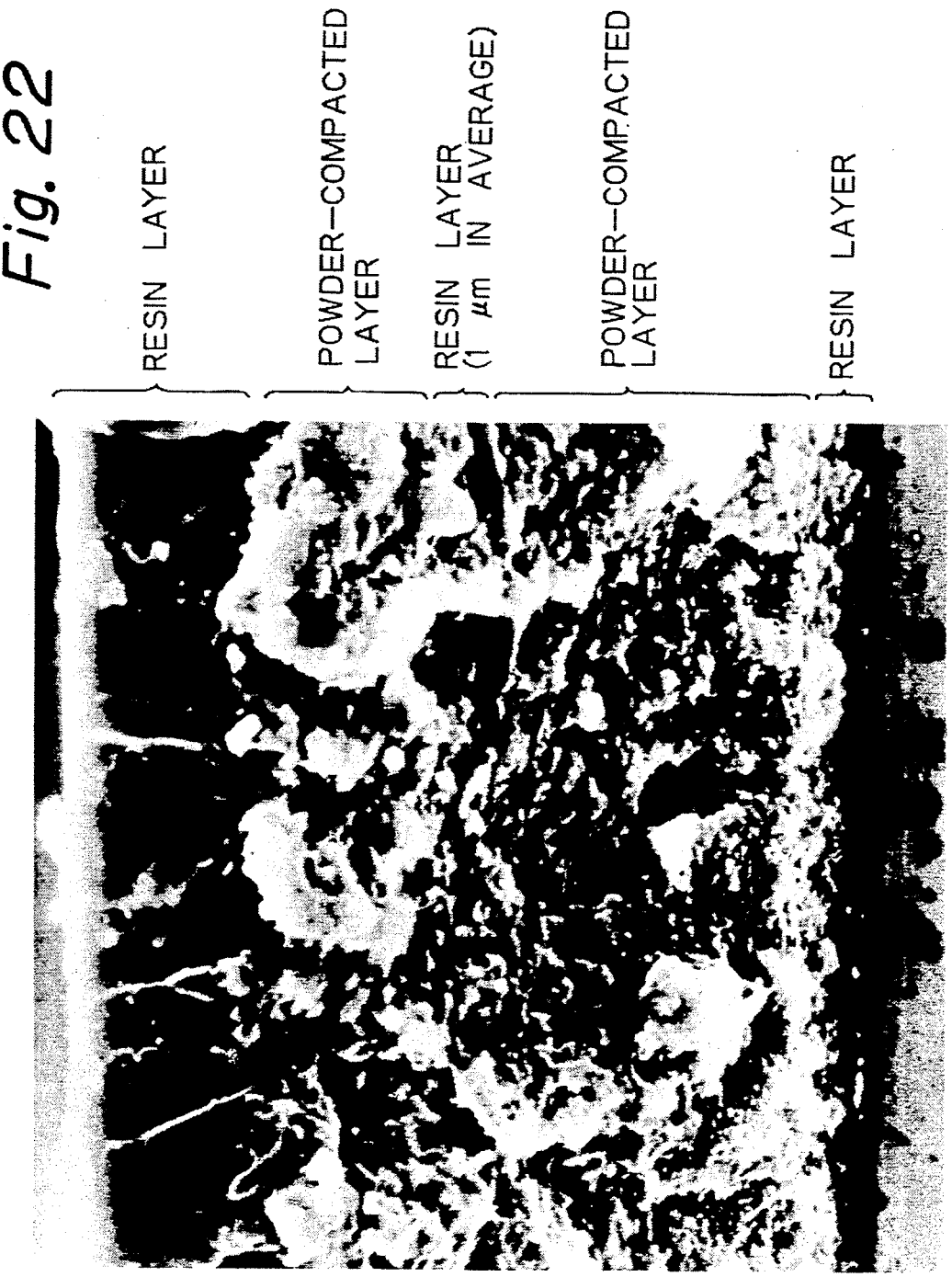

The above process was repeated once. The vibrating time was however 8 minutes. The magnets were then dipped in methylethyl ketone (MEK), in which 30% of epoxy resin (97% of resin and 3% of curing agent) was dissolved. Heat treatment was then carried out at 120° C. for 2 hours. The magnets were then cleaved. The fracture plane was observed by an SEM. The SEM image of the cross section is shown in FIG. 22. The SEM image of the surface is shown in FIG. 21.

The first resin layer and first powder-compacted layer are 1 $\mu$m and 18 $\mu$m thick, respectively. The second resin layer and second powder-compacted layer are 1 $\mu$m and 12 $\mu$m thick, respectively. The top resin layer is 9 $\mu$m thick. The powder content is 40% by volume or more both in the first and second powder-layers. The skeleton structure is unclear from FIG. 22, because the magnification was adjusted to 2600 so as to be able to observe the whole layers, and, also becauser the powder-particles were covered with resin. The skeleton structure was observed at magnification of 2000.

EXAMPLE 4

Figure 23:
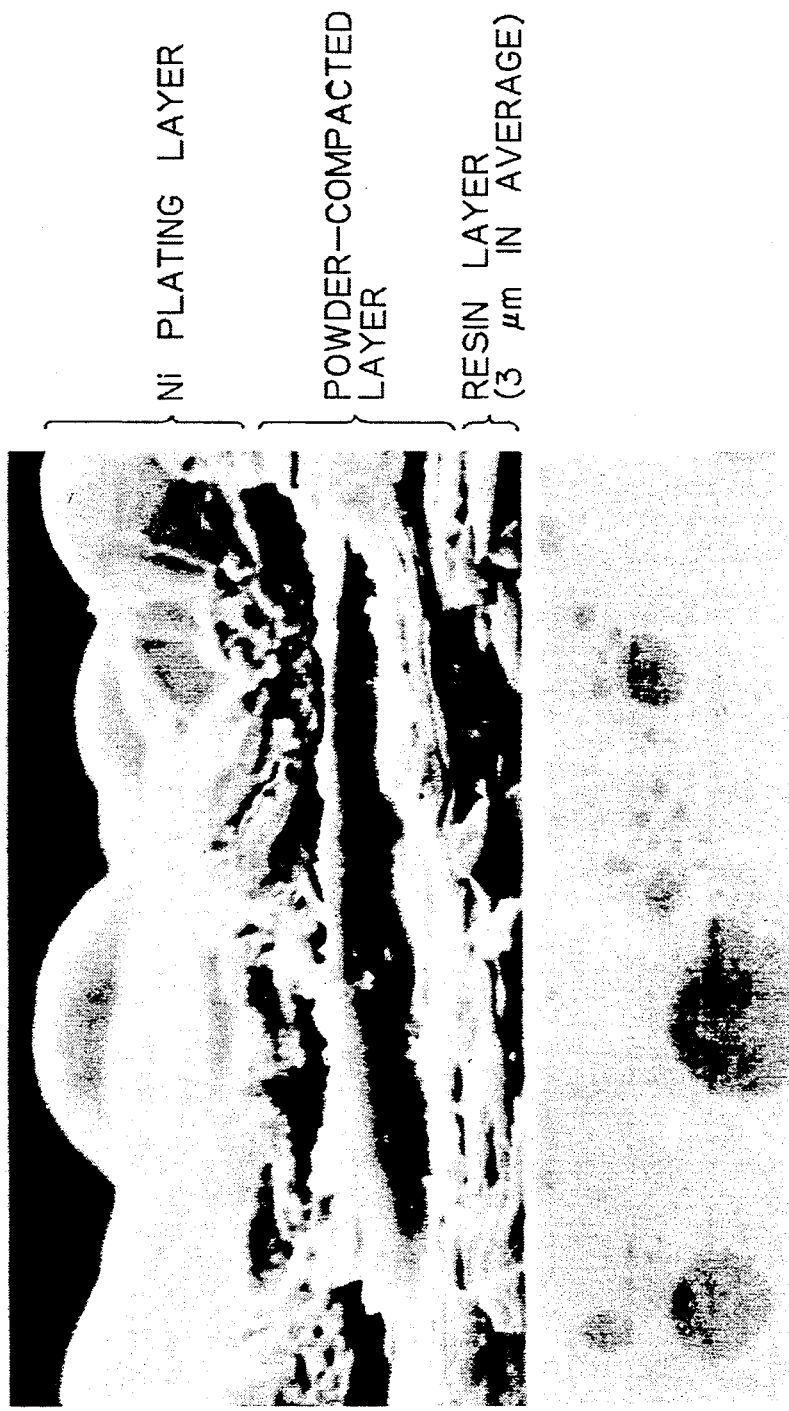
Figure 24:
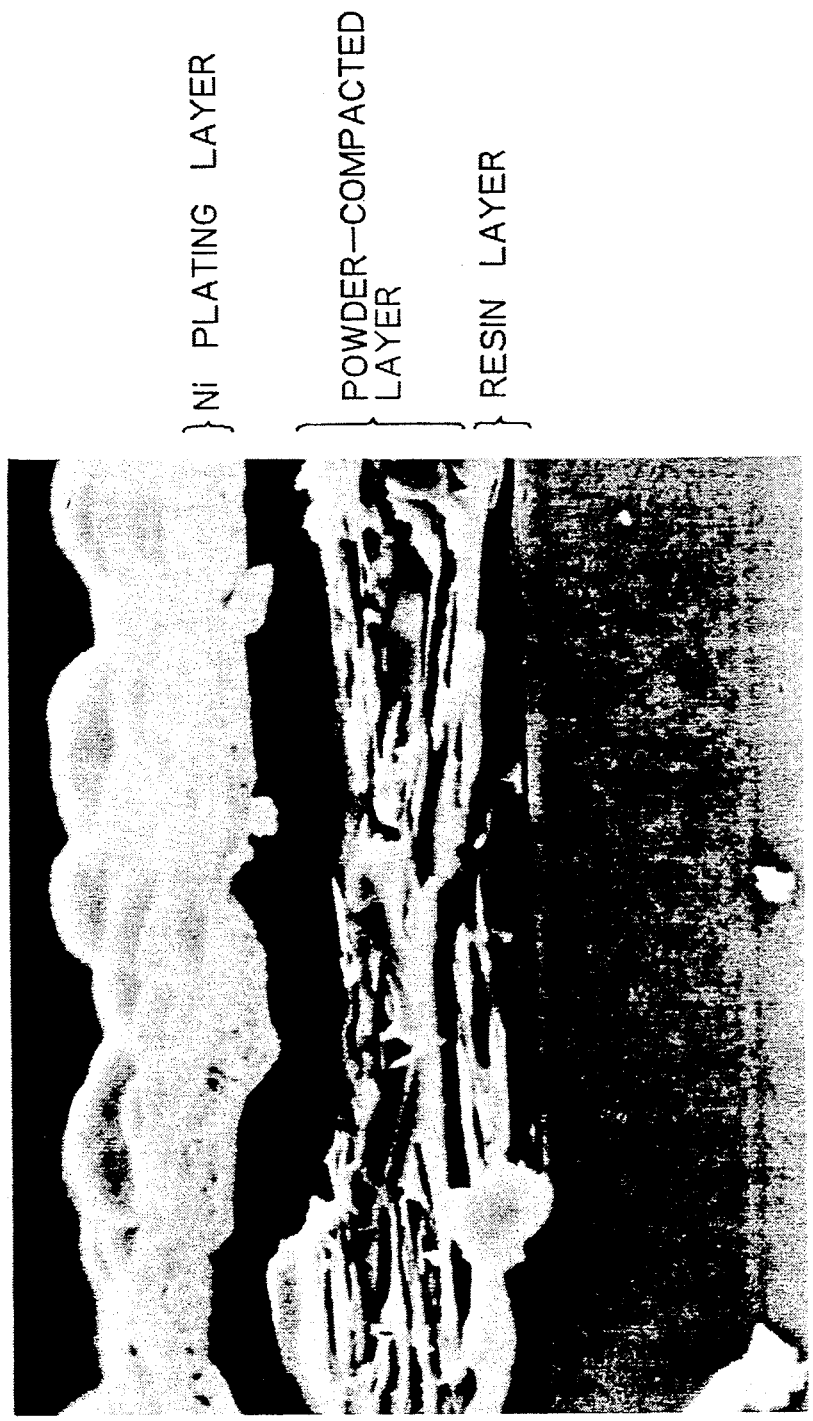

Steel balls 3.0 mm in diameter in a total amount of 10 kg were first loaded into a spherical pot 2.8 liter in volume and 150 mm in depth. Apparent filling density was approximately 5 kg/liter. While vibrations of 2500 cpm and 5 mm in amplitude were imparted to the pot, 30 g of atomized Al powder with am average diameter of 3 $\mu$m was loaded into the pot. Vibration was continued for 5 minutes. Twenty glass pieces were preliminarily dipped in methylethyl ketone (MEK), in which 15% of epoxy resin (97% of resin and 3% of curing agent) was dissolved. The glass pieces were thus coated with resin. The glass pieces were loaded into the pot and the vibration was carried out for 20 minutes. The glass pieces were then taken out from the pot. Heat treatment was carried out at 120° C. for 2 hours. The glass pieces were loaded into a container of the same size as described above together with 2.0 kg of walnut shells with an average particle-diameter of 2 mm. Vibration was carried out for 5 minutes to remove the Al powder remaining unfixed on the glass pieces. The glass pieces were taken out of the pot. Subsequently, the work pieces were subjected to electrolytic plating using a conventional Ni Watt bath to form a 4 $\mu$m thick Ni plating layer. The glass plates were then cleaved. The fracture plane was observed by an SEM. The SEM image of the cross section is shown in FIGS. 23 layer(-magnification-1300) and 24(magnification-930).

The resin layer and powder-compacted layer are 3 $\mu$m and 5 um thick, respectively. The powder content is 50% or more by volume. A cleavage formed at the cleaving appears between the Ni plating layer and the powder-compacted layer.

EXAMPLE 5

Rapidly cooled magnet powder was used. The composition was $Fe_{81}Nd_{13}B_6$, and the particle size was 100 $\mu$m or less. 3% by weight of epoxy resin was mixed with the magnet powder and compacted at a pressure of 5 ton/cm$^2$. One hundred forty green compacts 22 mm in outer diameter 20 mm in inner diameter and 10 mm in thickness were obtained. The green compacts were cured at 150° C. for 1 hour to produce the resin-bonded magnets.

Twenty magnets were subjected to each of Examples 1 through 4 so as to form the coating of the respective example. However, the thickness of the coating and respective layers is as follows.

| Example | Resin Layer | Thickness of Powder Layer | Thickness of Resin or Plating Layer | Total |
| --- | --- | --- | --- | --- |
| 1 | 1 $\mu$m | 10 $\mu$m | — | 11 $\mu$m |
| 2 | 1 $\mu$m | 9 $\mu$m | — | 10 $\mu$m |
| 3 | 1 $\mu$m × 2 | 8 $\mu$m × 2 | 2 $\mu$m | 20 $\mu$m |
| 4 | 1 $\mu$m | 5 $\mu$m | 10 $\mu$m | 16 $\mu$m |

For the purpose of comparison, the following methods (5) –(7) were carried out.

(5) Epoxy resin with 20% of $TiO_2$ additive was sprayed and applied on the resin-bonded magnets, followed by curing at 120° C. for 6 hours. The so-formed single coating layer was 20 um thick in average (comparative example)

(6) Zinc phosphate chemical conversion liquid was sprayed on the resin-bonded magnets and then dried. Epoxy-resin with 20% of $TiO_2$ additive was then spray-coated. Curing was carried out at 120° C. for 6 hours. The so-formed single coating layer was 20 $\mu$m thick in (comparative example).

(7) No coating was formed on the resin-bonded magnets, which were tested as produced (comparative example).

Twenty magnets treated by each of the methods as described above were subjected to a wet humid test under the conditions of 85° C. and 90% RH, so as to evaluate the corrosion-resistance. After the test, the appearance was checked.

TABLE 1

| Method | Exposure Time (hrs) | | | |
|---|---|---|---|---|
| (Example) | 250 | 500 | 1000 | 1500 |
| 1 | A | A | B | B |
| 2 | A | B | C | D |
| 3 | A | A | A | B |
| 4 | A | A | A | A |
| 5 | B | C | E | — |
| 6 | A | B | D | E |
| 7 | D | E | — | — |

Remarks
Judging Criterion:
A: No rust formation on all of the samples at all.
B: No rust formation macroscopically. However, spot rust formed on less than 10% of the samples, which was recognized by a microscope.
C: Such rust as detectable with the naked eye was formed on less than 10% of the samples.
D: Such rust as detectable with the naked eye was formed on from 10% to less than 30% of the samples.
E: Serious rust, swelling of coating, or peeling of coating occurred on 30% or more of the samples.

It was proven as a result of the above tests that the inventive coating is superior to the conventional resin-coating with regard to the corrosion resistance.

EXAMPLE 5

Samples were cut from a rolled low-carbon steel (0.03%C) 20 mm × 20 mm × 3 mm in size. Steel balls 3.0 mm in diameter of a total amount of 10kg were first loaded into a spherical pot 2.8 liter in volume and 150 mm in depth. While vibrations of 1000 cpm and 5 mm in amplitude were imparted to the pot, 30g of various powder was loaded into the pot being vibrated. Vibration was continued for 5 minutes to vibrate the Al and other powder as well as the steel balls. Ten samples of the cut steel sheets were preliminarily dipped in 10% epoxy resin solution in MEK. The samples were thus coated with resin. The samples were loaded in the pot and the vibration was carried out for 15 minutes. The samples were then taken out from the pot. Heat treatment was carried out at 120° C. for 2 hours. The samples were loaded into a container of the same size as described above together with 2.0kg of walnut shells with an average particle-diameter of 2 mm. Vibration was carried out for 5 minutes to remove the powder remaining unfixed on the samples. The samples were taken out of the pot and cleaved. Finally, the samples were dipped in 30% epoxy-resin solution (epoxy resin94% of resin and 6% of curing agent). After drying, curing was carried out at 120° C. for 2 hours.

Materials of powder, average diameter of particles and thickness of the formed powder layer are as follows.

| Material of Powder | Average particle-Diameter ($\mu$m) | Thickness of Powder-compacted Layer ($\mu$m) |
|---|---|---|
| 1 Al | 3 | 10 |
| 2 Cu | 2 | 10 |
| 3 Ti | 8 | 10 |
| 4 Stainless Steel | 3 | 10 |

-continued

| Material of Powder | Average particle-Diameter ($\mu$m) | Thickness of Powder-compacted Layer ($\mu$m) |
|---|---|---|
| 5 Cr | 2 | 10 |
| 6 Co | 2 | 10 |
| 7 Ni | 2 | 10 |
| 8 Zn | 2 | 15 |
| 9 Pb | 1 | 10 |
| 10 Sn | 2 | 15 |
| 11 Ag | 1 | 5 |
| 12 Au | 1 | 5 |
| 13 MgO | 0.5 | 10 |
| 14 $Al_2O_3$ | 0.5 | 10 |
| 15 $SiO_2$ | 0.7 | 10 |
| 16 $TiO_2$ | 0.3 | 10 |
| 17 $CrO_2$ | 0.6 | 10 |
| 18 $MnO_2$ | 0.9 | 10 |
| 19 $Fe_2O_3$ | 1.0 | 10 |
| 20 CoO | 0.8 | 10 |
| 21 NiO | 0.5 | 10 |
| 22 CuO | 0.9 | 10 |
| 23 ZnO | 0.3 | 10 |
| 24 $ZrO_2$ | 0.3 | 10 |
| 25 MoO | 0.4 | 10 |

The volume ratio of powder is 40% or more in the powder layer formed by any one of the methods.

For the purpose of comparison epoxy resin with 20% by volume of $TiO_2$ was sprayed on a sample and cured at 120° C. for 6 hours. As a result, a single resin coating with average thickness of 20 $\mu$m was formed.

The samples treated as described above were subjected to a neutral brine-water spraying test stipulated in the JIS corrosion test (35° C., 5% NaCl, 16 hours). Rust formed on the edges of all of the comparative samples. No rust was detected for the samples produced by the methods Nos. 1-25.

EXAMPLE 6

Twenty of the same steel samples as in Example 5 were prepared. Zn powder was used and the coating was formed under the same conditions as in Example 5 for ten samples. The other ten samples were subjected to shot blasting to clean the surface. A 40 $\mu$m thick Zn layer was formed on the samples by flame spraying. The samples with the coating formed as described above were subjected to the peeling test of coating. That is, five grooves each in horizontal and vertical directions were scratched crosswise on the coating with a knife at a distance of 1 mm to such a depth that they penetrate the coating. An adhesive tape (cellophane tape) was adhered on the coating with the grooves, and then peeled. The flame sprayed coating totally peeled. The inventive coatings did not peel at all.

EXAMPLE 7

The powder for bonded magnet was used. The powder had composition of $SmCo_{4.8}$ and average particle of 20 $\mu$m. 3% by weight of epoxy resin was mixed with the magnet powder and compacted at a pressure of 5 ton/cm². Eighty green compacts 22 mm in outer diameter 20 mm in inner diameter and 10 mm in thickness were obtained. The green compacts were cured at 150° C. for 1 hour to produce the resin-bonded magnets.

Steel balls 3.0 mm diameter in diameter in a total amount of 10 kg were first loaded into a spherical pot 2.8 liter in volume and 150 mm in depth. While vibrations of 2500 cpm and 0.5 to 5 mm in amplitude were imparted to the pot, 20 g of aluminum powder with an average diameter of 5 $\mu$m was loaded in the pot being vibrated. Vibration was continued for 5 minutes to vibrate the Al powder as well as the steel balls. Twenty magnets were preliminarily dipped in 10% epoxy resin solution in MEK. The magnets were thus coated with resin. The magnets were loaded in the pot and the vibration was carried out for 15 minutes. The magnets were then taken out from the pot. Heat treatment was carried out at 120° C. for 2 hours. The samples were loaded in a container of the same size as described above together with 2.0 kg of walnut shells with an average particle-diameter of 2 mm. Vibration was carried out for 5 minutes to remove the powder remaining unfixed on the magnets.

The following various kinds of power were coated on the magnets by the same methods as described above. Twenty magnets were produced for each kind of powder.

1—Coating with an average thickness of 10 μm by the above described method.

2—Instead of the aluminum powder, $TiO_2$ powder with the average diameter of 0.3 μm was used to form the coating with the thickness of 7 μm.

3—Epoxy resin with 20% of the $TiO_2$ additive was spray-coated on the resin-bonded magnets. Curing was carried out at 120° C. for 6 hours. A 10 μm thick single coating was obtained (comparative coating).

As a result of SEM observation, it turned out that, although the coatings 1 and 2 covered the entire surface of the magnets, the coating 3 was extremely thin on several edges of the magnets. Such thin coating would not cause the corrosion of SmCo magnets but would cause dusting of the magnet powder.

EXAMPLE 8

The powder for bonded magnet was used. The powder had composition of $Sm(Co_{0.72}Fe_{0.2}Cu_{0.06}Zr_{0.03})8.3$ and average particle of 20 μm. 3% by weight of epoxy resin was mixed with the magnet powder and compacted at a pressure of 5 ton/cm². One hundred green compacts 22 mm in outer diameter, 20 mm in inner diameter and 10 mm in thickness were obtained. The green compacts were cured at 150° C. for 1 hour to produce the resin-bonded magnets.

Steel balls 3.0 mm in diameter in a total amount of 10 kg were first loaded into a spherical pot 2.8 liter in volume and 50 mm in depth. While vibrations of 2500 cpm and 1 mm in amplitude was imparted to the pot. 20 g of copper powder with an average diameter of 1 μm was loaded into the pot being vibrated. Vibration was continued for 5 minutes to vibrate the Cu powder as well as the steel balls. Twenty magnets were preliminarily dipped in 10% epoxy resin solution of MEK. The magnets were thus coated with resin. The magnets were loaded into the pot and the vibration was carried out for 15 minutes. The magnets were then taken out from the pot. Heat treatment was carried out at 120° C. for 2 hours. The magnets were loaded into a container of the same size as described above together with 2.0 kg of walnut shells with an average particle-diameter of 2 mm. Vibration was carried out for 5 minutes to remove the powder remaining unfixed on the magnets. The resin-bonded magnets were then dipped in a 5% epoxy resin solution of MEK. After drying, curing was carried out at 120° C. and 2 hours.

Twenty magnets were coated with each of following various powder by the same method as described above. Twenty magnets were produced for each kind of powder. The magnets were subjected to test of corrosion resistance under the condition of 85° C. and 90% of relative humidity (RH).

1—Coating with an average thickness of 10 μm by the above described method.

2—Instead of the aluminum powder, $TiO_2$ powder with an average diameter of 0.3 μm was used to form 7 μm thick coating.

3—Epoxy resin with 20% of the $TiO_2$ additive was spray-coated on the resin-bonded magnets. Curing was carried out at 120° C. for 6 hours. A 10 um thick single coating was obtained (comparative coating).

4—The resin-bonded magnets as produced without the coating were subjected to the test.

TABLE 3

| Coating | Exposure Time (hours) | | | |
|---|---|---|---|---|
| | 250 | 500 | 1000 | 1500 |
| 1 | A | A | B | C |
| 2 | A | A | B | B |
| 3 | B | B | C | E |
| 4 | D | D | E | — |

The judging criterion is the same as described below Table 1.

EXAMPLE 9

An ingot having a composition of $Nd_{13.8}Dy_{0.4}Fe_{78.2}B_{7.6}$ was roughly crushed with a stamp mill to provide powder having average particle diameter of 20 μm and then finely crushed by a jet mill to provide powder having an average particle diameter of 3.0 um. The resultant fine powder was compacted in a metal die at a pressure of 1.5 t/cm², while applying 12 kOe of vertical magnetic field perpendicular to the pressing direction. The resultant green compacts were sintered in vacuum at 1100° C. for 2 hours and then aged at 650° C. for 1 hour. As a result, one hundred twenty sintered compacts were obtained. The entire surface of the sintered compacts were ground, followed by smoothening the corners with centrifugal barrel polishing. The sintered compacts were then cleaned and dried. The products were in the form of a disc 20 mm in diameter and 6 mm in height Steel balls 3.0 mm in diameter in a total amount of 10 kg were first loaded in a spherical pot 2.8 liter in volume and 150 mm in depth. While vibrations of 2500 cpm and 5 mm in amplitude were imparted to the pot, 20 g of aluminum powder with an average diameter of 4 um was loaded into the pot being vibrated. Vibration was continued for 5 minutes to vibrate the Al powder as well as the steel balls. Twenty magnets were preliminarily dipped in 10% epoxy resin solution of MEK. The magnets were thus coated with resin. The magnets were loaded into the pot and the vibration was carried out for 15 minutes. The magnets were then taken out from the pot. Heat treatment was carried out at 120° C. for 2 hours. The magnets were loaded into a container of the same size as described above together with 2.0 kg of walnut shells with an average particle-diameter of 2 mm. Vibration was carried out for 5 minutes to remove the powder remaining unfixed on the magnets.

Twenty magnets were coated with each of the following various powder by the same method as described above. The magnets were subjected to test of corrosion resistance under the condition of 85° C. and 90% of relative humidity (RH).

1—Coating with an average thickness of 10 μm by the above described method.

2—Instead of the aluminum powder, TiO₂ powder with an average diameter of 0.3 μm was used to form a 7 μm thick coating.

3—Instead of the aluminum powder, TiO₂ powder with the average diameter of 0.3 μm was used to form a coating. Subsequently, without removal of the unfixed remaining powder, the magnets were dipped in 5% epoxy resin solution of MEK. Again, TiO₂ powder with an average diameter of 0.3 μm was used to form a coating. Subsequently, without removal of the unfixed remaining powder, curing was carried out at 120° C. for 2 hours. Remaining unfixed powder was removed by walnut shells. As a result, a coating with an average thickness of 20 μm (maximum 27 μm, minimum 18 μm) was formed.

4—Instead of the aluminum power, TiO₂ powder with an average diameter of 1 μm was used to form a coating. Subsequently, without removal of the unfixed remaining powder, the magnets were dipped in 5% epoxy resin solution of MEK. Again, TiO₂ powder with an average diameter of 0.3 μm was used to form a coating. Subsequently, without removal of the unfixed remaining powder, curing was carried out at 120° C. for 2 hours. Remaining unfixed powder was removed by walnut shells. As a result, a coating with the average thickness of 22 um (maximum 29 μm, minimum 20 μm) was formed.

5—Instead of the aluminum powder, Fe₂O₃ powder with an average diameter of 1 um was used to form a coating.

6—Epoxy resin with 20% of TiO₂ additive was spray-coated on the magnets. Curing was carried out at 120° C. for 6 hours. A 10 μm thick single coating was formed (comparative example).

7—The magnets as produced were tested without coating (comparative example).

The results are given in Table 4.

TABLE 4

| Coating | Exposure Time (hours) | | | |
|---|---|---|---|---|
| | 250 | 500 | 1000 | 1500 |
| 1 | A | B | B | C |
| 2 | A | A | B | C |
| 3 | A | A | A | B |
| 4 | A | A | A | A |
| 5 | A | A | B | B |
| 6 | C | E | — | — |
| 7 | E | — | — | — |

EXAMPLE 10

An ingot having a composition of Nd₁₃.₈Dy₀.₄Fe₇₈.₂B₇.₆ was roughly crushed with a stamp mill to provide powder having an average particle diameter of 20 μm and then finely crushed with a jet mill to provide powder having average particle diameter of 3.0 μm. The resultant fine powder was compacted in a metal die at a pressure of 1.5 t/cm², while applying 12kOe of vertical magnetic field perpendicular to the pressing direction. The resultant green compacts were sintered in vacuum at 1100° C. for 2 hours and then aged at 650° C. for 1 hour. As a result, one hundred twenty sintered compacts were obtained. The entire surface of the sintered compacts were ground, followed by smoothening the corners with centrifugal barrel polishing. The sintered compacts were then cleaned and dried. The products were in the form of a disc 20 mm in diameter and 5 mm in height.

Steel balls in 3.0 mm diameter in amount of 10 kg were first loaded into a spherical pot 2.8 liter in volume and 150 mm in depth. While vibrations of 2500 cpm and 5 mm in amplitude were imparted to the pot, 20 g of aluminum powder with 1 μm of average diameter was loaded in the pot being vibrated. Vibration was continued for 5 minutes to vibrate the Al powder as well as the steel balls. Twenty magnets were preliminarily dipped in 10% epoxy resin solution of MEK. The magnets were thus coated with resin. The magnets were loaded into the pot and the vibration was carried out for 15 minutes. The magnets were then taken out from the pot. Heat treatment was carried out at 120° C. for 2 hours. The magnets were loaded into a container of the same size as described above together with 2.0 kg of walnut shells with an average diameter of 2 mm. Vibration was carried out for 5 minutes to remove the powder remaining unfixed on the magnets. Subsequently, the sintered compacts were dipped in 5% epoxy-resin solution of MEK. After drying, curing was carried out at 120° C. for 2 hours.

The following various powder was coated on the magnets by the same methods as described above.

1—Coating with an average thickness of 10 μm by the above described method.

2—The above coating process was repeated twice to form a coating with an average thickness of 20 μm.

3—Epoxy resin with 20% of TiO₂ additive was spray-coated on the sintered magnets. Curing was carried out at 120° C. for 6 hours (comparative example).

It was confirmed by naked eye and an optical microscope that the coatings 1 and 2 were smooth and free of defects. Thickness of coating 3 was not uniform because of liquid sagging.

EXAMPLE 11

An ingot having a composition of SmCo₄.₆ was roughly crushed with a stamp mill to provide powder having an average particle diameter of 25 μm and then finely crushed with a jet mill to provide powder having an average particle diameter of 4.0 μm. The resultant fine powder was compacted in a metal die at a pressure of 1.5 t/cm², while applying 12 kOe of vertical magnetic field perpendicular to the pressing direction. The resultant green compacts were sintered in vacuum at 1210° C. for 2 hours and then slowly cooled. As a result, eighty sintered compacts were obtained. The entire surface of the sintered compacts were ground, followed by smoothening the corners with centrifugal barrel polishing. The sintered compacts were then cleaned and dried. The products were in the form of a disc 20 mm in diameter and 5 mm in height.

Steel balls in 3.0 mm diameter in amount of 10 kg were first loaded into a spherical pot 2.8 liter in volume and 150 mm in depth. While vibration of 2500 cpm and 5 mm in amplitude was imparted to the pot, 20 g of TiO₂ powder with 3 μm of average diameter was loaded in the pot being vibrated. Vibration was continued for 5 minutes to vibrate the TiO₂ powder as well as the steel balls. Twenty magnets were preliminarily dipped in 10% epoxy resin solution of MEK. The magnets were thus coated with resin. The magnets were loaded in the pot and the vibration was carried out for 15 minutes. The magnets were then taken out from the pot. Heat treatment was carried out at 120° C. for 2 hours. The magnets were loaded in the container of the same size as described above together with 2.0 kg of walnut shells an average diameter of 2 mm. Vibration was carried out for 5 minutes to remove the powder remaining unfixed on the magnets. Subsequently, the sintered compacts were dipped in 5% epoxy resin solution of MEK. After drying, curing was carried out at 120° C. for 2 hours.

EXAMPLE 12

The following powder was compacted by a die-pressing method so as to produce green compacts in the form of a ring 25 mm in outer diameter, 20 mm in inner diameter and 10 mm in height.

(A) Al-2.75 wt% Li (gas-atomized powder; average particle-diameter-20 μm; compacting pressure-2 ton/cm$^2$)

(B) Mg (gas-atomized powder; average particle diameter-20 μm; compacting pressure-2 ton/cm$^2$)

The green compacts were sintered at 600° C. for 6 hours in Ar atmosphere. Density of every sintered compacts was 90% relative to the true density. Twenty sintered compacts were coated by each of the following treatments.

(1) Steel balls in 3.0 mm diameter in amount of 10 kg were first loaded in a spherical pot 2.8 liter in volume and 150 mm in depth. The apparent density was approximately 5 kg/liter. While vibrations of 2500 cpm and 5 mm in amplitude were imparted to the pot, 20 g of TiO$_2$ powder with an average diameter of 1 μm was loaded in the pot being vibrated. Vibration was continued for 5 minutes to vibrate the TiO powder and the steel balls so as to uniformly distribute the TiO$_2$ powder. Twenty sintered compacts were preliminarily dipped in 10% epoxy resin (97% by weight of resin and 3% by weight of curing agent) solution of MEK. The sintered compacts were thus coated with resin. The sintered compacts were loaded into the pot and the vibration was carried out for 15 minutes. The sintered compacts were then taken out from the pot. Heat treatment was carried out at 120° C. for 2 hours. The sintered compacts were loaded into a container of the same size as described above together with 2.0 kg of walnut shells with an average particle-diameter of 2 mm. Apparent density was 1 kg/liter. Vibration was carried out for 5 minutes to remove the powder remaining unfixed on the magnets. Average thickness of the coating was 10 μm.

(2) Approximately 5 um thick Cu coating was formed by the same method as (1) using 15 g of Cu powder having a particle diameter of 1 um. Subsequently, electro-plating was carried out to form an Ni coating with an average thickness of 10 μm (maximum-14 μm and minimum-8 um).

(3) The sintered compacts were dipped in a commercially available Zn-replacement solution, which contained sodium hydroxide, zinc oxide, Roschel salt, and other trace additives. Subsequently, electro-plating was carried out using an Ni Watt bath to form an Ni coating with the average thickness of 10 μm (comparative example).

(4) Epoxy resin with 20% of carbon black additive was spray-coated on the sintered compacts to form a coating with average thickness of 10 μm.

(5) Sintered compacts as produced were tested without coating.

Twenty sintered compacts produced by each of (1)–(5), above, were exposed to 85° C. and 90% RH. The judging criterion is the same as in Table 2.

The results are given in Table 5.

TABLE 5

| Powder | Coating | Exposure Time (hours) | | | |
|---|---|---|---|---|---|
| | | 250 | 500 | 1000 | 1500 |
| A | 1 | A | A | A | B |
| | 2 | A | A | A | A |
| | 3 | A | E | — | — |
| | 4 | B | D | E | — |
| | 5 | E | — | — | — |
| B | 1 | A | A | A | A |
| | 2 | A | A | A | A |
| | 3 | A | E | — | — |
| | 4 | B | D | E | — |
| | 5 | E | — | — | — |

Numerous swelling of coating occurred for the sintered compacts A,B treated by 3. This seemed to be caused by remaining plating liquid.

EXAMPLE 13

The following powder was compacted by a die-pressing method so as to produce green compacts 20 mm × 20 mm × 5 mm in size.

(A) Fe-0.3%C (electrolytic and annealed powder; average particle diameter-50 μm; compacting pressure-3 ton/cm$^2$)

(B) Al-1%Si (gas-atomized powder; average particle diameter-25 μm; compacting pressure-3 ton/cm$^2$)

The green compacts were sintered at 1300° C. for 6 hours in vacuum for the powder (A). The green compacts were sintered at 600° C. for 6 hours for the powder (B). Densities of the sintered compacts (A) and (B) were 85% and 90% relative to the true density, respectively. The following coating treatments were applied to every twenty sintered compacts.

(1) Steel balls 3.0 mm in diameter in a total amount of 10 kg were first loaded into a spherical pot 2.8 liter in volume and 150 mm in depth. The apparent density was approximately 5 kg/liter. While vibrations of 2500 cpm and 5 mm in amplitude were imparted to the pot, 20 g of Fe$_2$O$_3$ powder with 1 μm of average diameter was loaded in the pot being vibrated. Vibration was continued for 5 minutes to vibrate the Fe$_2$O$_3$ powder and the steel balls, so as to uniformly distribute the Fe$_2$O$_3$ powder. Twenty sintered compacts were preliminarily dipped in 10% epoxy resin (97% by weight of resin and 3% by weight of curing agent) solution of MEK. The sintered compacts were thus coated with resin. The sintered compacts were loaded into the pot and the vibration was carried out for 15 minutes. The sintered compacts were then taken out from the pot. Heat treatment was carried out at 120° C. for 2 hours. The sintered compacts were loaded into a container of the same size as described above together with 2.0 kg of walnut shells with an average diameter of 2 mm. Apparent density was 1 kg/liter. Vibration was carried out for 5 minutes to remove the powder remaining unfixed on the magnets. Average thickness of the coating was 10 μm.

(2) Approximately 5 μm thick Cu coating was formed by the same method as (1) except that instead of epoxy resin a phenol resin was used, and, further 15 g of Cu powder having a particle diameter of 1 μm was used. Subsequently, electro-plating was carried out to form an Ni coating with an average thickness of 10 μm.

(3) The sintered compacts were Zn-replacement plated by the method of Example 12 (3). Subsequently, electro-plating was carried out to form an Ni coating with an average thickness of 10 μm (comparative example).

(4) Epoxy resin with 20% of $TiO_2$ additive was spray-coated on the sintered compacts to form a coating with an average thickness of 10 μm.

(5) Sintered compacts as produced were tested without coating.

The sintered compacts treated as described above were subjected to the neutral brine-water spraying test stipulated under JIS corrosion test (35° C., 5% NaCl). Appearance of the sintered compacts was then observed. The test results are given in Table 6.

TABLE 6

| Powder | Coating | Exposure Time (hours) | | | |
|---|---|---|---|---|---|
| | | 24 | 48 | 120 | 240 |
| A | 1 | A | A | C | C |
| | 2 | A | A | A | A |
| | 3 | C | D | E | — |
| | 4 | C | E | — | — |
| | 5 | E | — | — | — |
| B | 1 | A | A | B | C |
| | 2 | A | A | A | A |
| | 3 | C | D | E | — |
| | 4 | B | C | E | — |
| | 5 | E | — | — | — |

Numerous swelling of coating occurred for the sintered compacts A, B treated by 3.

EXAMPLE 14

The following non-metal members were produced.

A. The starting material powder was prepared by mixing $NiO:Fe_2O_3$ $ZnO=20:50:30$ (mole ratio). The starting material powder was compacted and sintered to produce an Ni-Zn ferrite sintered compact having 98% of density relative to the true density). The sintered compact was cut and ground to obtain a block 15 mm×15 mm×5 mm in size.

B. The starting material powder was prepared by mixing $SrCO_3:Fe_2O_3:=1:5.9$ (mole ratio). The starting material powder was compacted and sintered to produce an Sr ferrite sintered compact having 98% of density relative to the true density). The sintered compact was cut and ground to obtain a cylindrical body 15 mm in diameter and 4 mm in height.

The following coating treatments were applied to the non metal members A and B.

Figure 34A:
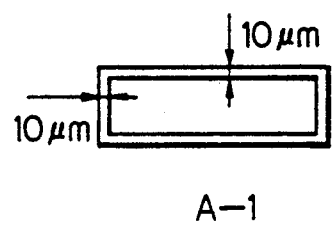
FIGS. 34 (a), (b) and 35(a), (b) schematically show the thickness of coatings formed by the various methods.
Figure 34B:
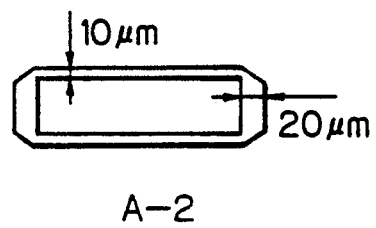
Figure 35A:
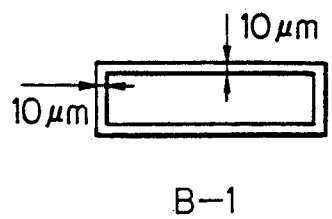
Figure 35B:
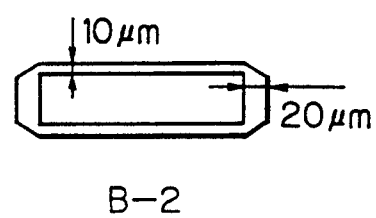

(1) $TiO_2$ coating was formed by the method of Example 12 (FIG. 34,A-1; FIG. 35,B-1)

(2) Epoxy resin coating ($TiO_2$ content-20%) was spray coated. (FIG. 34,A-2; FIG. 35,B-2)

After the treatments, the members were cut and thickness distribution on the members was observed with a microscope. As is clear from FIG. 34 and 35, that the inventive method (1) enables coating with more uniform thickness than the conventional method (2).

EXAMPLE 15

Twenty plastic parts in the form of a hemispherical shape 40 mm in diameter and 2 mm in thickness were prepared. 10 kg of steel balls 1.0 mm in diameter was loaded into a spherical pot 2.8 liter in volume and 150 mm in depth. 10 g of Cu powder with 1 μm of average particle-diameter was also loaded into the spherical pot. Vibration was imparted to the steel balls and Cu powder for 15 minutes. MEK was blown on the entire surface of the parts to provide an adhesive surface. The parts were then loaded into the pot being vibrated. Vibration was continued for 15 minutes. The plastic parts were then taken out of the pot and were heated at 50° C. for 2 hours. The plastic parts were then loaded, together with 2 kg of walnut shell (average particle diameter-2 mm) into another pot having the same size as the above pot. Vibration was carried out for 5 minutes so as to remove the free remaining Cu powder.

An approximately 4 μm thick coating was thus formed on the plastic parts. Surface resistance was infinite before the treatment but was decreased to 1.2-85 Ω/□ after the treatment. An Ni plating could be easily formed using a conventional Watt bath. The Ni plating layer could not be peeled by a tape-peeling test.

When 20 g of the Cu powder was used, an approximately 10 μm thick Cu coating was formed and had surface resistance of from 2 to 115 Ω/□. Subsequently, a gold plating was carried out to form an approximately 2 μm thick golden plating layer.

EXAMPLE 16

The process according to Example 9 was continued until the powder loading. Then, 30 g of tin powder with an average particle diameter of 1 μm was loaded. The subsequent process was carried out as in Example 9.

The coated magnets were heated at 300° C. for 4 hours in vacuum. Then, the corrosion-resistance under 85° C. and 90% RH was evaluated. The results are given in Table 7 with regard to the following treatments.

1—Tin coating (as described above; an average thickness of coating-10 μm)

2—Spray coating (epoxy resin with 20% of $TiO_2$; an average thickness of coating-10 μm)

3—No coating

TABLE 7

| Coating | Exposure Time (hours) | | | |
|---|---|---|---|---|
| | 250 | 500 | 1000 | 1500 |
| 1 | A | A | A | A |
| 2 | C | E | — | — |
| 3 | E | — | — | — |

EXAMPLE 17

Acrylic resin parts in the form of a ring 10 mm in outer diameter, 9 mm in inner diameter and 5 mm in height were prepared. 10 kg of steel balls 2.0 mm in diameter was loaded into a spherical pot 2.8 liters in volume and 150 mm in depth. 30 g of $Fe_3Nd_{13}B_6$ powder with an average particle-diameter of 50 μm, which was rapidly quenched powder for bonded magnet, was also loaded into the spherical pot. Vibration was imparted to the steel balls and magnet powder for 5 minutes. MEK was blown on the entire surface of the ring parts to provide an adhesive surface. The ring parts were then loaded in the pot being vibrated. Vibration was continued for 25 minutes. The ring parts were subsequently taken out of the pot. 10% of epoxy resin solution of MEK was blown on the inner surface of the ring. Heating was then carried out at 50° C. for 2 hours. An approximately 25 μm thick magnet layer was formed on the inner surface of the ring. By magnetizing the ring, a stator of a small-sized motor could be obtained.

EXAMPLE 18

Twenty acrylic-resin pieces 12 mm×12 mm×4 mm in size were dipped in MEK to dissolve their surfaces to provide adhesive surfaces. 2 liters of alumina balls with 1 mm in diameter, whose surface was coated with resin, were loaded into a pot in the form of a doughnut with a volume of 2.8 liters. 10 g of aluminum powder with an average diameter of 3 μm was then loaded into the pot. Vibrations of 4000 cpm and 0.5 mm in amplitude were imparted to the acrylic resin pieces, aluminum powder and alumina balls for 20 minutes. The acrylic resin pieces were then taken out of the pot. Curing was carried out at 80° C. for 1 hour.

The coating on one of the sides of the acrylic-resin pieces was 10 μm thick in average. The aluminum content in the vicinity of the coating surface was 80% or more. Electro-conductivity of the coating surface was confirmed by a conductivity checker.

EXAMPLE 19

The acrylic-resin pieces, which have been treated in Example 18, were dipped in an epoxy resin (97% of resin and 3% of curing agent) solution of MEK. The so-treated pieces were loaded in a pot with 5 liters of volume, together with 2 liter of steel balls 0.5 mm in diameter. The steel balls were preliminarily Ni-plated to prevent the contamination by steel. Epoxy resin was coated on the Ni plating.

Four pots were preliminarily prepared. Powder loaded into the pots were: 10 g of Ni powder with particle diameter of 1 μm in the first pot; 10 g of Sn powder with particle diameter of 5 μm in the second pot; 10 g of $TiO_2$ powder with particle diameter of 0.1 μm in the third pot; and, 10 g of Cu powder with particle diameter of 15 μm in the fourth pot. Four pots were vibrated once by a centrifugal barrel machine for five minutes. Rotation number of the main axis of the centrifugal barrel machine was 10-160 rpm. The acrylic resin pieces were then taken out of the pots and cured at 80° C. for 1 hour.

Thickness of the Ni, Sn and Cu coating formed on one side of the acrylic-resin pieces was 6 μm in average. The powder density on the Ni, Sn and Cu coating surface was 60% or more. Thickness of the $TiO_2$ coating formed on one side of the acrylic-resin pieces was 4 μm in average. The powder density on the Ni, Sn and Cu coating surface was 50% or more. The acrylic resin pieces with Ni, Sn or Cu coating exhibited electro-conductivity, while the pieces with $TiO_2$ coating exhibited electro-insulating property.

EXAMPLE 20

Stainless steel discs 50 mm in outer diameter, 10 mm in central aperture, and 0.2 mm in thickness were thoroughly cleaned and then dipped in an MEK solution, in which 15% of epoxy resin (97% of resin and 3% of curing agent) was preliminarily dissolved. Steel balls in 1 mm diameter were loaded into the pot of a planetary mill to provide 40% of the steel-ball volume. Into the other planetary mill, 40% by volume of the steel balls was loaded. Appropriate amount of diamond powder 1 μm in particle diameter was in was loaded into one of the pots. Fluorescent powder 0.8 μm in particle diameter in appropriate amount was loaded in the other pot. The two pots were mounted on one planetary mill and stirred at 10-200 rpm. The work pieces were taken out of the pots and cured at 100° C. for 1 hour.

Thickness of the diamond and fluorescent-powder coatings formed on one side of the stainless steel discs were 13 μm and 4 μm in average. The powder density on the surface of the both coatings was 40% or more.

EXAMPLE 21

Steel balls 2 mm in diameter were plated with Ni and then epoxy resin on the surface thereof. The steel balls in 1.5 liter of volume and 8 g of aluminum powder with an average particle-diameter 4 μm were loaded into a pot A. Vibrations of 3000 cpm and 5 mm of amplitude were imparted to pot A for 80 minutes.

Forty Nd-Fe-B sintered compacts 10 mm × 10 mm × 2 mm in size were dipped in epoxy resin, which was diluted with MEK, and were cleaned by ultra-sonic wave for 3 minutes. The sintered compacts were then taken out from the MEK solution, followed by drying. The sintered compacts were then loaded into the pot A. Vibrations of 3000 cpm and 1.5 mm of amplitude were imparted to the pot A for 15 minutes. Curing was carried out at 120° C. for 2 hours.

Two liters of steel balls 1 mm in diameter, which were plated with Ni and then epoxy resin on the surface thereof, were loaded into a pot B. The steel balls, 10 g of $TiO_2$ powder with an average particle-diameter of 0.3 μm and 3 g of thermo-setting type epoxy resin were loaded into a pot B. Rotation of 50-180 rpm was carried out for 10 minutes so as to uniformly distribute $TiO_2$ on the surface of steel balls by break-in operation. The pot B was then opened. The work pieces, which were preliminarily coated with Al, and 2 g of $TiO_2$ powder were loaded in the pot B. A centrifugal barrel machine was operated at 50-120 rpm for 10 minutes, so as to coat the work pieces with $TiO_2$ powder by strong stirring force. All of the work pieces were then taken out of the pot and cured at 100° C. for 1.5 hours.

Finally, the work pieces were thinly coated with commercially available acrylic resin to improve appearance and prevent dusting. The work pieces were cleaved to investigate s the fracture by an electron microscope. It turned out that uniform two-layer coating of 6 μm thick Al layer and 4 μm thick $TiO_2$ layer was formed.

EXAMPLE 22

Twenty Nd-Fe-B permanent-magnet sintered compacts 5 mm × 5 mm × 2 mm size and 2 liters of steel balls 1 mm in diameter were loaded into each of four pots with 5 liters of volume, of a centrifugal barrel machine. Furthermore, 20 g of aluminum powder with an average particle diameter of 3 μm, and 5 g of paraffin binder, 10 g of polypropylene, 10 g of wax, and 10 g of epoxy resin were loaded into each pot. The centrifugal barrel machine was operated at 20-160 rpm for 5 minutes to coat the sintered compacts with the Al powder by strong centrifugal force. The sintered compacts were taken out of the pots. The work pieces were cleaved to investigate the fracture by an electron microscope. It turned out that uniform 6 μm, 8 μm, 15 μm and 4 μm thick Al layers were formed.

EXAMPLE 23

10 kg of Ni-plated steel balls 2 mm in diameter were loaded into a pot with 2.8 liters of volume. 10 g of aluminum powder with an average particle diameter of 3 μm was loaded into the pot. 15 cc of epoxy-resin (94% of epoxy resin and 6% of curing agent) solution of MEK was then loaded into the pot. Vibration was imparted to the steel balls, aluminum powder and epoxy resin for 30 minutes. The aluminum powder was uniformly captured on the surface of all steel balls by uncured resin.

Seventeen magnets, which are the same as those of Example 11, were dipped in the epoxy-MEK solution mentioned above and then dried. The magnets were then loaded in the pot mentioned above. Vibration was carried out for 20 minutes. The magnets were taken out of the pot and, then, the resin was cured at 120° C. for 2 hours. A 12 μm thick aluminum-powder coating was thus uniformly formed. The vibration condition was the same as in Example 11.

In this example, cracking of corners of the magnets was slight as compared with Example 11. Thickness of the coating in this example was more uniform than in Example 11.

EXAMPLE 24

Ni-plated steel balls 2 mm and 3 mm in diameter were loaded in a total amount of 10 kg at a proportion of 1:1 into a pot with 2.8 liters of volume and 150 mm in depth. While vibrations of 2500 cpm and 5 mm in amplitude were imparted to the pot, 20 g of aluminum powder with an average particle diameter of 3 μm was loaded into the pot. Vibration was continued for 5 minutes.

Twenty MQ bonded magnets (20 mm in outer diameter, 16 mm in inner diameter and 9 mm in height) were preliminarily dipped in 10% epoxy resin (97% by weight of resin and 3% by weight of curing agent) solution of MEK. The sintered compacts were thus coated with resin. The sintered compacts were loaded into the pot and the vibration was carried out for 15 minutes. The sintered compacts were then taken out from the pot and heated at 120° C. for 2 hours. The sintered compacts were dipped in 5% epoxy-resin solution to cover the surface with the resin.

The magnets were again subjected to second vibrating treatment together with the aluminum powder with an average particle diameter of 3 μm for 10 minutes. The magnets were taken out of the pot and dried, and, then cured at 120° C. for 2 hours. The magnets were then dipped in 10% epoxy resin of MEK. Curing was then carried out at 120° C. for 3 hours.

The double coated magnets as described above exhibited excellent corrosion resistance.

Figure 25A:
Figure 25B:

One of the magnets was buried in epoxy resin, polished by Emery paper and finish polished with buff to observe a cross sectional structure of the coating with SEM. The result is shown in FIGS. 25(a) and (b). As is apparent from these photographs, originally spherical Al particles are collapsed and are bonded in the horizontal direction to form a skeleton structure. A resin layer is sandwiched between the first and second Al layers. Another resin layer is present between the first Al layer and the bonded magnet and is connected with the above-mentioned resin layer in the bonded magnet.

EXAMPLE 25

Resin-bonded magnets were dipped in 10% epoxy-resin solution of MEK. Ultra sonic vibration was imparted to this solution for 2 minutes to form a resin coating on the magnets. The resin-coated magnets, chromium-plated steel balls with a diameter of 2 mm, and 20 g of Ag powder from 0.1 to 1 μm in size were loaded in the same vibrating barrel as in Example 24 and were vibrated for 20 minutes under the same condition as in Example 24. The inner atmosphere of the barrel was air. The magnets were taken out from the barrel, dried at room temperature for 20 minutes and then cured at 120° C. for 2 hours.

Figure 26A:
Figure 26B:
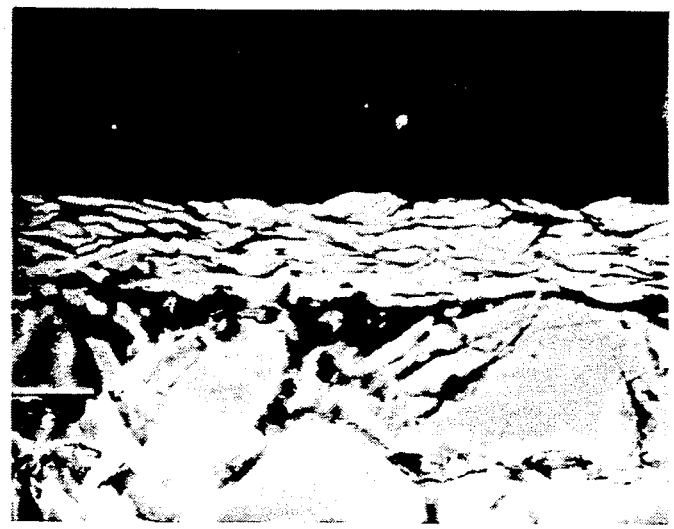
Figure 27:
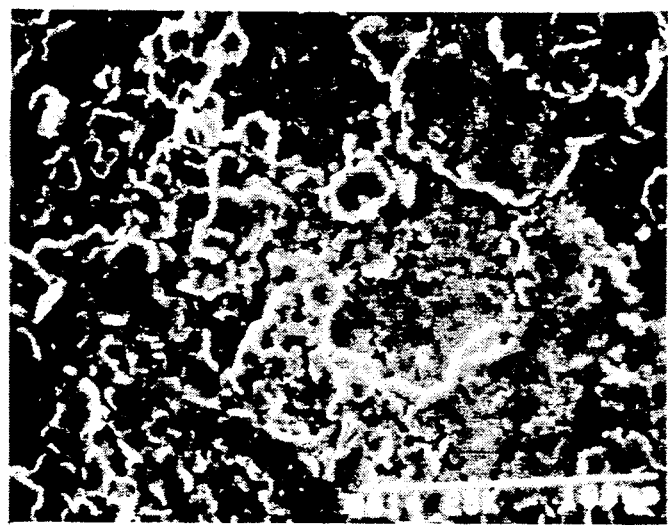

The thus coated magnets were polished by the same method as in Example 24 to observe the SEM image of the cross section, which is shown in FIGS. 26(a) and (b). The SEM image of the surface of the coating is shown in FIG. 27. The coating formed in this example was approximately 10 μm thick and had a skeleton structure. The surface resistance was 0.1/or less, which was very high notwithstanding barrel treatment in air.

For the comparison purpose, Ag powder and epoxy resin were diluted with MEK and sprayed on the bonded magnets. The Ag content was made as high as possible but did not exceed a level that the mixture becomes non-sprayable. Surface resistance of the resultant Ag coating was 10/or more for the 10 μm thick coating.

EXAMPLE 26

Figure 28:
Figure 29:
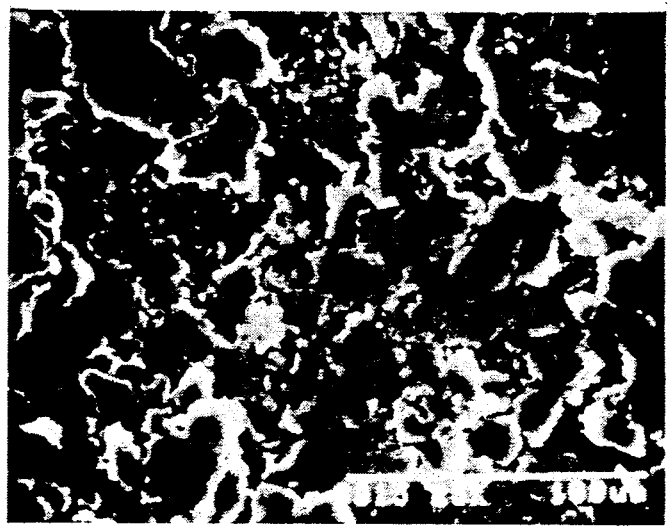
Figure 30:
Figure 31:
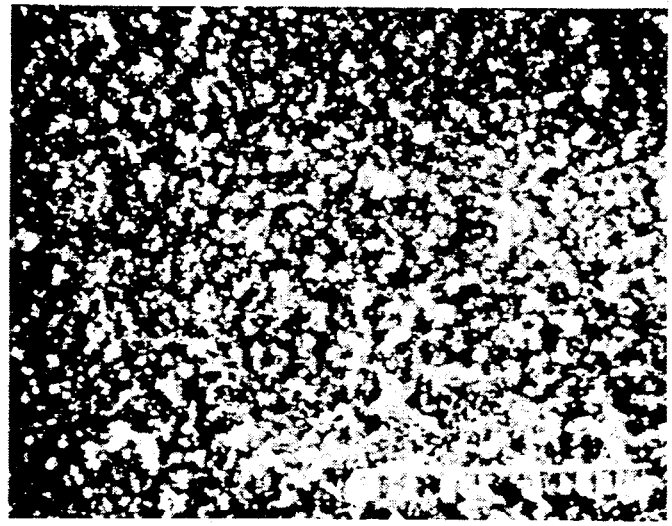

The Cu coating and Ni coating were formed by using the Cu powder with an average particle diameter of 10 um and the Ni powder with an average particle diameter of 0.8 um, respectively, under the same condition as in Example 25. However, nitrogen gas atmosphere was produced in the barrel in the case of forming the Cu coating. SEM images of the Cu coating are shown in FIG. 28(polished cross section) and 29(non-polished surface). SEM images of the Ni coating are shown in FIG. 30 (polished cross section) and 31(non-polished surface).

Figure 32:
FIGS. 32 and 33 are the photographs showing the structure of the conventional paint-coating.
Figure 33:
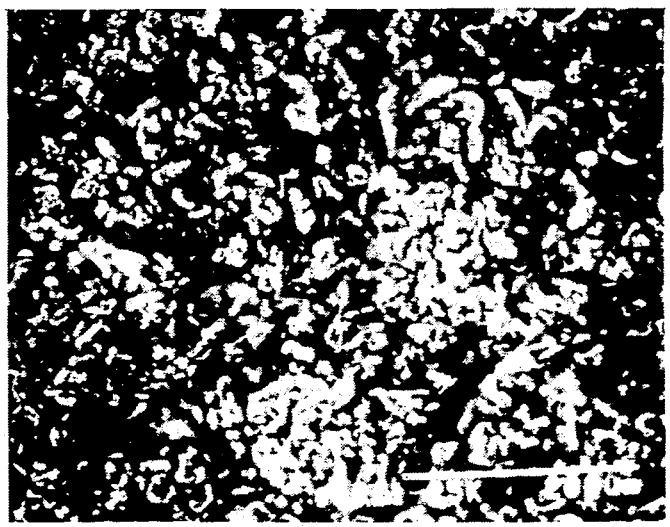

For the comparison purpose, the electro-conductive paint was prepared using the same Cu powder mentioned above and solvent. The so prepared paint was sprayed to form a coating which does not have the skeleton structure. SEM image of the of the comparative coating are shown in FIGS. 32 and 33, respectively. From comparison of FIGS. 28-31 with FIGS. 32-33, it is clear that the powder filing ratio is very high in the case of the skeleton structure.

Surface electro-resistance of the surface of the Cu coating having the skeleton structure was 0.2Ω/□ for a 25 μm thick coating. Contrary to this, the sprayed Cu coating without the skeleton structure was approximately 0.5Ω/□ for a 70 μm thick coating.

EXAMPLE 27

Ni-plated steel balls 1 mm in diameter in a total amount of 10 kg were loaded into a pot with 2.8 liters of volume and 150 mm in depth. 3cc of 10% epoxy-resin (97% of resin and 3% of curing agent) solution of MEK was sprinkled over the steel balls. Vibrations of 3600 cpm and 0.5-2 mm in amplitude were imparted to the pot for 10 minutes so as to thoroughly spread resin on the steel balls. 25 g of Ag powder with particle-diameter of 0.5-1 μm was loaded into the pot. Vibration under the same condition as above was continued for 1 hour.

Boxes with an open top, 70 mm in length, 49 mm in width and 10 mm in depth were prepared as work pieces. These work pieces were made of PC/ABS alloy-resin and masked on the outer surface. 10% epoxy-resin (94% of resin and 6% of curing agent) solution of MEK was sprayed on the inner surface of the work pieces. The work pieces were then loaded into the pot. The same vibrations as mentioned above were imparted to the pot so as to form an Ag layer on the inner surface of the work piece. The work pieces were then taken out of the pot and then loaded into another pot, into which 10 kg of Ni-plated steel balls 2 mm in diameter in a total amount of 10 kg were preliminarily loaded. Vibrations of 5000 cpm and 0.2–1 mm in amplitude were imparted to the pot for 10 minutes so as to remove excess Ag powder deposited on the surface of the work pieces and to enhance the uniformity of the coating. The work pieces were then taken out of the pot and their resin were cured at 60° C. for 2 hours. As a result, a uniform coating with an average thickness of 14 μm was formed on the inner side of the work pieces. Surface resistance of the coating was 0.1Ω/□. The inter-layer resistance of the coating was from 0.1 to 0.5Ω/□.

On the inner surface of the work pieces treated as described above, electro-conductive polymer based on poly-aniline ("Electromagnetic Guard Spray", Trade Name of Sumitomo MMM) was sprayed and dried at 60° C. for 5 minutes. An electro-conductive poly-aniline coating with an average thickness of 5 um was formed on the Ag coating. Surface resistance and inter-layer resistance of the whole coating were 0.1Ω/□ or less. The entire coating did not peel, when subjected to a tape-peeling test.

We claim:

1. A method for forming a coating on parts, comprising vibrating or stirring in a container said parts, a liquid or semi-liquid curable first resin which is at least partially uncured at least in an initial period of the coat-firming, a powder material and means for mediating the formation of the coating, thereby forming the coating on said parts containing the powder material,
wherein the means for mediating is of substantially smaller size than said parts and of a greater size than said powder material.

2. A method according to claim 1, wherein said first resin contains solvent.

3. A method according to claim 1, wherein said parts, said powder material and said first resin are successively or simultaneously loaded into the container and said mediating means is loaded prior to the loading of said parts, said resin and said powder material and are subjected to said vibration or stirring.

4. A method according to claims 1, wherein said parts are further subjected to removal of the powder material remaining unfixed thereon.

5. A method according to claim 1, wherein said coating on said parts is subjected to heat treatment.

6. A method according to claim 1, wherein said parts, on which said coating is formed, are subjected to formation of a coating of a second resin thereon.

7. A method according to claim 6, wherein said coating of said second resin is formed by subjecting said parts to vibration or stirring in a container which contains said second resin and mediating means for forming the coating, which means is substantially smaller than said parts.

8. A method according to claim 6, wherein the coating of said second resin is carried out by painting.

9. A method according to claim 1, wherein said powder material is electro-conductive, and, after formation of said coating, a layer of metal or alloy is formed on said coating.

10. A method according to claim 9, wherein the formation of said layer of metal or alloy is carried out by an electro- or electroless plating.

11. A method according to claim 1, 2, 3, 4, 5, 6, 7, 8, 9 or 10, wherein an inorganic adhesive material, which replaces a part or all of the first resin, is subjected to vibration or stirring.

12. A method for forming a coating on parts, comprising vibrating or stirring in a container said parts, on which is formed a film of a first liquid or semi-liquid curable resin which is at least partially uncured at least in an initial period of the coat-forming, a powder material and means for mediating the formation of the coating, thereby forming the coating on said parts containing the powder material,
wherein the means for mediating is of substantially smaller size than said parts and of a greater size than said powder material.

13. A method according to claim 12, further comprising the steps of loading a second resin which is at least partially uncured at least in an initial period of the coating-forming into the container and subjected the container to said vibration or stirring.

14. A method according to claim 12 or 13, wherein said first or second resin contains solvent.

15. A method according to claim 13, wherein said parts, said powder material and said first resin are successively or simultaneously loaded into the container and said mediating means is loaded prior to the loading of said parts, said resin and said powder material and are subjected to said vibration or stirring.

16. A method according to claims 12 or 13 wherein said parts are further subjected to removal of power material remaining unfixed thereon.

17. A method according to claim 12 or 13 wherein said coating on said parts is subjected to heat treatment.

18. A method according to claim 12 or 13 wherein said parts, on which said coating is formed, are subjected to formation of a coating of a second resin.

19. A method according to claim 18, wherein said coating of said second resin is formed by subjected said parts to vibration or stirring in a container which contains said second resin and mediating means for forming the coating, which means is substantially smaller than said parts.

20. A method according to claim 12 or 13 wherein the coating of said second resin is carried out by painting.

21. A method according to claim 12 or 13 wherein said powder material is electro-conductive, and, after formation of said coating, a layer of metal or alloy is formed thereon.

22. A method according to claim 21, wherein the formation of said layer of metal or alloy is carried out by an electro- or electroless plating.

23. A method according to claim 13, wherein an inorganic adhesive material, which replaces a part or all of the third resin, is subjected to vibration or stirring.

24. A method according to claim 1, 2, 3 or 6, further comprising the step of curing the first resin in the coating after said vibrating or stirring is carried out.

25. A method according to claim 1, 2, 3 or 6, wherein said parts are coated with said first resin prior to the carrying out of said vibrating or stirring.

26. A method according to claim 1, 2, 3 or 6, wherein the first resin remains liquid or semi-liquid as said vibrating or stirring is carried out.

27. A method according to claim 12, 13, 15 or 18, further comprising the step of curing the first resin in the coating after said vibrating or stirring is carried out.

28. A method according to claim 12, 13, 15 or 18, wherein said parts are coated with said first resin prior to the carrying out of said vibrating or stirring.

29. A method according to claim 12, 13, 15 or 18, wherein the first resin remains liquid or semi-liquid as said vibrating or stirring is carried out.

* * * * *